United States Patent
Oberdörfer et al.

(10) Patent No.: US 12,535,165 B2
(45) Date of Patent: Jan. 27, 2026

(54) PLUG CONNECTOR WITH MOUNTING PROTECTION

(71) Applicant: VOSS Automotive GmbH, Wipperfürth (DE)

(72) Inventors: Alexander Oberdörfer, Radevormwald (DE); Eugen Heinrichs, Bergneustadt (DE)

(73) Assignee: Voss Automotive GmbH, Wipperfürth (DE)

( * ) Notice: Subject to any disclaimer, the term of this patent is extended or adjusted under 35 U.S.C. 154(b) by 0 days.

(21) Appl. No.: 18/832,347

(22) PCT Filed: Feb. 1, 2023

(86) PCT No.: PCT/EP2023/052379
§ 371 (c)(1),
(2) Date: Jul. 23, 2024

(87) PCT Pub. No.: WO2023/148189
PCT Pub. Date: Aug. 10, 2023

(65) Prior Publication Data
US 2025/0102090 A1    Mar. 27, 2025

(30) Foreign Application Priority Data

Feb. 1, 2022    (DE) .......................... 102022102278.1
Mar. 2, 2022    (DE) .......................... 102022104970.1

(51) Int. Cl.
*F16L 37/14*    (2006.01)
(52) U.S. Cl.
CPC .................................. *F16L 37/144* (2013.01)

(58) Field of Classification Search
CPC ................... F16L 37/142; F16L 37/144; F16L 37/1225; F16L 37/12; F16L 37/098; F16L 37/0985; F16L 37/0841
See application file for complete search history.

(56) References Cited

U.S. PATENT DOCUMENTS

| 5,607,190 A  | * | 3/1997 | Exandier | F16L 37/0985 |
| | | | | 285/308 |
| 10,047,889 B2 | * | 8/2018 | Chaupin | F16L 37/0885 |

(Continued)

FOREIGN PATENT DOCUMENTS

| EP | 3171066 A1 | 5/2017 |
| WO | 2021/190897 A1 | 9/2021 |

*Primary Examiner* — Aaron M Dunwoody
(74) *Attorney, Agent, or Firm* — Honigman LLP; Eric J. Sosenko; Jonathan P. O'Brien

(57) ABSTRACT

A connector having a base element with a through channel fluidically connected to an end of the base element formed as a sleeve section. A clamp cage is inserted into a receptacle channel of the sleeve section and axially held in a positive-locking manner. Two retaining arms of a retaining clip project into a through opening of the clamp cage in a rest state and are elastically expandable radially to the through opening into a tension state. The retaining clip is displaceable between an insertion position where the retaining arms are expandable into their tension state and a blocking position where they are blocked against expansion. The retaining clip has two bearing arms which are radially elastic, fix the clamp cage in the receptacle channel in a positive-locking manner and, in a rest state, project into the through opening and are radially elastically expandable into a tension state.

28 Claims, 17 Drawing Sheets

(56) References Cited

U.S. PATENT DOCUMENTS

| | | | |
|---|---|---|---|
| 11,035,507 B2* | 6/2021 | Yanagisawa | F16L 37/088 |
| 11,199,281 B2* | 12/2021 | Gauthier | F16L 37/0985 |
| 2002/0084652 A1* | 7/2002 | Halbrock | F16L 37/144 |
| | | | 285/305 |
| 2004/0036283 A1* | 2/2004 | Furuya | F16L 37/0985 |
| | | | 285/305 |
| 2007/0040377 A1* | 2/2007 | Moretti | F02M 55/004 |
| | | | 285/305 |
| 2012/0119485 A1* | 5/2012 | Cichorek | F16L 37/0985 |
| | | | 285/308 |
| 2012/0211977 A1* | 8/2012 | Callahan | F16L 37/144 |
| | | | 285/313 |
| 2016/0069496 A1* | 3/2016 | Tayama | F16L 21/045 |
| | | | 285/374 |
| 2017/0067588 A1* | 3/2017 | Chaupin | F16L 37/144 |
| 2017/0146173 A1 | 5/2017 | Chaupin et al. | |
| 2019/0390807 A1* | 12/2019 | Yanagisawa | F16L 37/088 |
| 2020/0149670 A1* | 5/2020 | Wehrmann | F16L 37/144 |
| 2022/0243850 A1* | 8/2022 | Teasley | F16L 37/0841 |
| 2023/0383882 A1* | 11/2023 | Oberdörfer | F16L 37/144 |

\* cited by examiner

PLUG CONNECTOR WITH MOUNTING PROTECTION

BACKGROUND AND SUMMARY OF THE INVENTION

The invention relates to a connector for connecting a first fluid line to a mating connector. The connector has a base element with a through channel. The through channel is fluidically connected to an end of the base element formed as a sleeve section, wherein a clamp cage is arranged in a receptacle channel of the sleeve section. The clamp cage can be inserted into the receptacle channel of the sleeve section in a mounting direction and is held in a positive-locking manner axially to the mounting direction. Two retaining arms running parallel to each other of a retaining clip that can be inserted into the clamp cage perpendicular to the mounting direction protrude into a through opening of the clamp cage in a rest state of the retaining arms and are designed to be elastically expandable radially to the through opening into a tension state. The retaining clip is designed to be displaceable radially to the through opening from an insertion position into a blocking position and from the blocking position into the insertion position. The retaining arms are expandable into their tension state in the insertion position of the retaining clip. In addition, the retaining arms are blocked against expansion into their tension state in the blocking position of the retaining clip.

A connector for connecting a mating connector is known from WO 2015/181396 A2. In this connector, the clamp cage has latching tongues extending in the mounting direction which, when inserted, engage in recesses in a circumferential wall of the sleeve section in a positive-locking manner in the axial direction. Furthermore, this connector has latching arms extending against the mounting direction, which prevent the mating connector from moving against the mounting direction. It has been found to be a disadvantage that the latching tongues, which hold the clamp cage positive-locking in the sleeve section, must be dimensioned so large that a relatively large installation space is required.

WO 2015/181396 A2 provides a locking element arranged on the outer circumference of the sleeve section to prevent unintentional release of the mating connector. The locking element is arranged to be axially displaceable relative to the mounting direction, whereby the locking element prevents the latching arms from spreading radially in a lock position, thereby preventing the mating connector from being released. It has been shown that the locking element can move into the lock position even without the mating connector being inserted and prevents the mating connector from being inserted. Furthermore, additional assembly steps are required for locking, which also increase the assembly effort.

Another disadvantage are the latching arms, which cover the plug shank of the mating connector over a certain axial length to maintain the radial elastic properties, but only offer a relatively small surface area overlap of the mating connector. Particularly with large sizes and vibrations, especially with mating connectors with a mating diameter of more than 14 mm, failure and detachment of the mating connector from the connector can therefore occur under certain conditions. It has also been found to be disadvantageous that leakage or damage to the clamp cage can occur under high tensile or compressive loads.

The invention is based on the task of providing a connector which overcomes the disadvantages known from the prior art and in particular improves at least the resistance, the tightness and/or the assembly.

According to the invention, the task is solved by the features of the characterizing part of claim 1. In that the retaining clip has two bearing arms which are elastic radially to the through opening and the bearing arms fix the clamp cage in the receptacle channel in a positive-locking manner axially to the mounting direction and project into the through opening in a rest state of the bearing arms and are designed to be elastically expandable radially to the through opening into a tension state, the axial extension of the clamp cage is shortened, so that installation space is saved, which can optionally be made available to additional sealing means.

Furthermore, the holding clamp according to the invention has the advantage that it fixes both the clamp cage in the receptacle channel of the sleeve section and the mating connector in the through opening of the clamp cage. Conveniently, the number of elements of the connector is reduced by integrating the pre-assembly lock into the retaining clip, which also results in a reduction in the number of assembly steps.

In addition, the embodiment according to the invention provides a technical possibility that the retaining clip cannot be transferred to the blocking position when the bearing arms are in the rest state. Advantageously, this provides a pre-assembly lock which prevents the retaining clip from being moved into the blocking position even before the mating connector is inserted into the through opening and prevents the mating connector from being inserted.

In a particular embodiment of the invention, while the bearing arms are in the rest state and the retaining clip is in the insertion position, the retaining clip is blocked against displacement from the insertion position to the blocking position. Advantageously, this prevents the retaining clip from being moved into the blocking position and blocking insertion of the mating connector.

A further advantageous embodiment provides that while the retaining arms are in the tension state and the retaining clip is in the insertion position, the retaining clip is blocked against displacement from the insertion position to the blocking position. This design advantageously prevents the retaining clip from being displaced into the blocking position before the mating connector is fully inserted. In particular, incorrect assembly is prevented and an additional assembly check is provided.

It is also advantageous that while the bearing arms are in the rest state and the retaining clip is in the blocking position, the retaining clip is positively locked against displacement from the blocking position to the insertion position. Advantageously, before the retaining clip is transferred to the insertion position, which could potentially allow the risk of unintentional release of the mating connector from the through opening, a force fit must first be overcome. In particular, this design makes the connector more resistant to external influences such as vibrations.

During an insertion process, the mating connector with a plug shank is inserted into the through opening in the mounting direction. In the through opening, the plug shank passes through a section in which the retaining arms protrude into the through opening and a section in which the bearing arms protrude into the through opening. Preferably, the plug shank, the retaining arms and the bearing arms are designed to correspond to each other in such a way that the plug shank exerts a force acting radially outwards to the mounting direction on the retaining arms and the bearing arms. As a result of the outwardly acting force, the retaining arms and the bearing arms are each elastically deformed radially outwards from the rest state into the tension state.

Conveniently, the mating connector behind the plug shank has a groove, which has a smaller diameter than the plug shank.

The retaining arms are conveniently arranged in an assembled state of the connector, in particular with the mating connector fully inserted into the through channel in the mounting direction, adjacent to the latching groove of the fully inserted mating connector. Advantageously, the retaining arms relax due to the reduced diameter of the locking groove, so that the retaining arms deform from the expanded tension state in the area of the locking groove back into the rest state. This conveniently blocks axial movement of the mating connector against the mounting direction in a positive-locking manner.

Because the mating connector advantageously adjusts the tension state and the rest state of the retaining arms and/or the bearing arms, it is possible to check the insertion depth of the mating connector during and after the insertion by controlling the condition of the retaining arms and/or the bearing arms.

The retaining clip is conveniently U-shaped. Preferably, the bearing arms and the retaining arms are also connected to each other via a connecting section. In particular, the connecting section is simultaneously a force application point, so that the radial displacement of the retaining clip from the blocking position to the insertion position and from the insertion position to the blocking position can be caused by a pull or pressure on the connecting section. Preferably, in particular in order to reduce the assembly effort, the bearing arms and the retaining arms extend in the same direction from the connecting section to a free end in each case, wherein in a particular embodiment the bearing arms and the retaining arms are arranged axially spaced apart from one another, expediently in such a way that a gap is formed between a bearing arm and a retaining arm in each case.

According to an advantageous variant of the connector, it is provided that the retaining clip has at least two pressure-locking humps formed on the retaining arms and/or on the connecting section on the side facing towards the mounting direction. The pressure-locking humps protrude towards the mounting direction in such a way that they can be supported radially to the through opening on an inner circumferential wall of the through opening in the blocking position of the retaining clip. In particular, when a mating connector is fully inserted into the plug connector, the retaining clip is displaced axially against the mounting direction when the system is under pressure in such a way that the pressure locking humps are arranged in a gap between the plug shank and the circumferential wall of the through opening. The pressure locking humps block the retaining arms from expanding radially into their tension state and/or prevent the retaining clip from being transferred from the blocking position to the insertion position. Unintentional release of the retaining clip or the mating connector is thus counteracted by the pressure locking humps.

The retaining clip is also designed in such a way that, when the mating connector is fully inserted, the retaining clip rests axially on a bearing surface of the clamp cage pointing in the mounting direction with an area adjacent to the pressure-locking humps on the side facing against the mounting direction and rests radially against a circumferential wall of the through opening with the pressure-locking humps.

Particularly advantageous are at least two pressure locking humps on the retaining arms opposite each other. The pressure locking humps are preferably designed and arranged in such a way that the pressure locking humps are arranged on an axis of symmetry of the through opening within the through opening in the blocking position of the retaining clip and the rest state of the retaining arms. The axis of symmetry of the through opening is in particular that which extends perpendicular to the direction of displacement of the retaining clip.

According to a variant of the invention, the clamp cage has two windows that are open radially to the through opening. Advantageously, a reinforcing strut extending axially to the through opening is arranged in each of the windows. Advantageously, the reinforcing struts stiffen the connector, in particular the clamp cage, at least axially to the mounting direction. The stiffening also means that tensile or compressive loads are distributed more evenly around the circumference of the connector. In particular, this prevents leaks and damage.

In particular, in an advantageous embodiment of the invention, the retaining arms reach through the windows in such a way that the retaining arms are arranged radially between the through opening and the reinforcing struts. Advantageously, the retaining arms are arranged in such a way that the retaining arms project into the through opening of the clamp cage in the rest state.

It is particularly advantageous for the base element to have four axial guide slots distributed around the circumference, which are arranged offset by 90° to each other and open towards the mounting direction. The reinforcing struts are advantageously designed with a radial projection towards the clamp cage in such a way that they engage in the guide slots to arrange the clamp cage in the receptacle channel and block rotation.

Advantageously, the reinforcing struts are designed with a socket in such a way that, in a state of the clamp cage mounted in the receptacle channel, the sockets ensure an advantageous distance between a collar of the clamp cage and an end of the base element pointing against the mounting direction.

In a preferred embodiment of the invention, the sleeve section and the clamp cage each have radial breakthroughs at least with respect to the mounting direction. In particular, in an inserted state of the clamp cage in the sleeve section, an aperture of the clamp cage and of the sleeve section are each arranged in alignment with one another, so that the retaining clip with the bearing arms can be inserted radially to the mounting direction through the breakthroughs of the clamp cage and of the sleeve section into the through opening of the clamp cage. In particular, the arrangement by means of the bearing arms, which engage through the respective breakthroughs, is an easy to manufacture and simple fixation of the clamp cage in the sleeve section of the base element.

Conveniently, the radially open windows for the arrangement and passage of the retaining arms are spaced axially to the mounting direction from the breakthroughs for the arrangement and passage of the bearing arms. Particularly advantageous for a simple and quick assembly of the retaining clip, especially for the displacements between the blocking position and the insertion position, the windows and breakthroughs are arranged axially one behind the other, in particular without an angular offset to the through opening. Advantageously, the bearing arms and the retaining arms are formed correspondingly axially one behind the other on the retaining clip, so that one retaining arm and one bearing arm are arranged axially offset in each case.

Preferably, the clamp cage has detents pointing radially outwards. The bearing arms advantageously have bearing grooves corresponding to the detent means. In particular, the detents engage in the bearing grooves in the rest state of the bearing arms and the insertion position of the retaining clip. Advantageously, this ensures that the detents block a positive-locking displacement of the retaining clip from the insertion position to the blocking position in the rest state of the bearing arms.

According to a further development, the bearing arms have radially inwardly pointing expanding means. In the insertion position of the retaining clip and the rest state of the bearing arms, the expanding means protrude into the through opening in such a way that the bearing arms are expandable from the rest state to the tension state via the expanding means when the mating connector is inserted in the mounting direction. In particular, the plug shank of the mating connector lifts the detents out of the bearing grooves, which advantageously releases a displacement of the retaining clip from the insertion position to the blocking position. This design improves safety in such a way that the retaining clip is transferred to the blocking position in a pre-assembled or partially assembled state, with a mating connector that is not or not fully inserted, and unintentionally blocks the insertion of the mating connector with the retaining arms.

A further variant provides that the bearing grooves are advantageously arranged behind the spreading means in a direction in which the bearing arms extend. In particular, a positioning groove is formed between the respective bearing groove and the respective spreading means. Preferably, in the rest state of the bearing arms and in the blocking position of the retaining clip, the detent means of the clamp cage is arranged in the positioning groove in such a way that the expanding means is supported in a force-locking manner on an outer circumference of the mating connector, in particular of the plug shank of the mating connector, and conveniently generates a resistance to a displacement of the retaining clip from the blocking position into the insertion position. The resistance is particularly advantageous in order to prevent unintentional release of a displacement of the retaining clip from the blocking position to the insertion position. This would potentially result in an uncontrollable release of the plug shank from the through opening or a displacement of the mating connector from the through opening against the mounting direction. This design is therefore particularly advantageous in the event of high vibrations and other external influences on the connector.

The bearing arms each have at least one expansion slope that rises towards the free end of the bearing arms. In particular, one expansion slope opens above the bearing groove. It is preferable that the bearing groove directly adjoins the expansion slope. In particular, the detent can slide over the expansion slope when the retaining clip is transferred from the blocking position to the insertion position, so that the bearing arm is elastically deformed radially outwards while protecting the material and the detent is lifted out of the position groove. A blockage between the detent and the positioning groove is advantageously overcome synergistically.

As an alternative or supplement to the aforementioned design, it has proven to be advantageous for one of the expansion slopes rising towards the free end of the bearing arms to open above the positioning groove and for the positioning groove to directly adjoin the expansion slopes.

In particular when the retaining clip is moved from the blocking position to the insertion position, the expansion slope of the positioning groove is supported on an outer circumference of the mating connector, in particular the plug shank of the mating connector, so that the bearing arm is elastically deformed radially outwards in a way that protects the material and the detent is lifted out of the positioning groove. Advantageously, a blockage between the detent and the positioning groove is overcome synergistically.

The expansion slopes have the advantage that when the retaining clip is displaced radially to the through opening from the blocking position to the insertion position, the bearing arm is elastically deformed radially in synergy with the displacement. The blockage between the detent and the positioning groove is thus designed as a surmountable resistance that is sufficiently strong to prevent an unintentional change of position. In particular, the resistance to be overcome can be set via an adjustment angle of the respective expansion slopes.

A further embodiment provides that the bearing grooves, viewed in the direction of extension of the bearing arms, are arranged in front of the expanding means. It is expedient that the detent of the clamp cage is arranged in the bearing groove in the rest state of the bearing arms and in the insertion position of the retaining clip in such a way that a resistance to a displacement of the retaining clip from the insertion position to the blocking position is generated.

According to an advantageous variant of the previously described embodiment of the invention, the bearing arms each have at least one expansion slope that rises towards the free end of the bearing arms. In particular, one expansion slope in each case opens above the bearing groove. The bearing groove is preferably directly adjacent to the expansion slope. Alternatively or additionally, an expansion slope is formed on each of the expanding means. Preferably, in the rest state of the bearing arms and the blocking position of the retaining clip, the expansion means can be supported in a force-locking manner on an outer circumference of the mating connector, thereby creating resistance to a displacement of the retaining clip from the blocking position to the insertion position.

In one variant of the invention, the retaining arms each have a retaining groove that is open radially outwards. Preferably, this retaining groove is designed to correspond to a blocking means of the clamp cage in such a way that, in the tension state of the retaining arms and in the insertion position of the retaining clip, the blocking means is arranged in the retaining groove. Advantageously, the blocking means is arranged in the retaining groove in such a way that a displacement of the retaining clip from the insertion position to the blocking position is blocked.

It has been shown to be advantageous for assembly safety that, by means of this design, the retaining clip can only be transferred from the insertion position to the blocking position when the mating connector with the plug shank is completely arranged in the through opening. In particular, the mating connector with the plug shank is arranged completely in the through opening when the locking groove of the mating connector is arranged adjacent to the retaining arms. Advantageously, when the mating connector with the plug shank is fully inserted, the retaining arms, which are elastically deformed into the tension state, form back into the rest state, whereby they are arranged in the latching groove. Conveniently, when the retaining arms are in the rest state, the blocking means is then lifted out of the retaining groove and the blocking is released against transfer of the retaining clip from the insertion position to the blocking position. The fact that the retaining clip can only be transferred from the insertion position to the blocking position when the retaining arms are in the rest state makes it easy to check the insertion state of the mating connector.

Preferably, a first groove wall of the retaining groove pointing towards the free end of the retaining arm is formed by a bearing element projecting radially outwards from the retaining arm. In particular in the rest state of the retaining arm and the blocking position of the retaining clip, the bearing element lies against the blocking means, pointing radially outwards towards the through opening, in such a way that radial expansion of the retaining arms into the tension state is blocked. In this state, the transfer of the retaining arms from the rest state to the tension state is also advantageously blocked.

Advantageously, this variant of the invention prevents unintentional release of the mating connector from the through opening after the retaining clip has been transferred to the blocking position following complete insertion of the mating connector into the through opening. In particular, to release the blocking against the elastic deformation of the retaining arms into the tension state, it is necessary for the retaining clip to be transferred into the insertion position. In combination with the aforementioned advantageous design, the synergetic effect is that the resistance caused by the expansion slopes must first be overcome in order to move the retaining clip into the insertion position. This provides a means of preventing unintentional displacement of the mating connector out of the through opening against the mounting direction.

The bearing element is conveniently designed as a ramp element, with the ramp element preferably having a sloping surface that rises towards the free end of the retaining arm. The sloping surface conveniently ends at the first groove wall of the retaining groove. In particular, the sloping surface has manufacturing advantages.

In particular, the bearing element, preferably the ramp element, can be designed to correspond with the blocking means in such a way that the retaining arm is pressed slightly elastically radially inwards in the rest state, so that a radial restoring force of the retaining arm presses the bearing element against the blocking means, for example to avoid vibrations and components colliding with one another.

Advantageously, the reinforcing struts serve as blocking means, so that the reinforcing struts designed as blocking means are advantageously arranged in the retaining grooves in the rest state of the retaining arms and in the insertion position of the retaining clip. The effect is that the rigidity of the clamp cage and simultaneously the assembly safety of the connector is improved.

According to a preferred embodiment of the invention, the retaining clip has at least one support arm. A variant with two or more support arms has also proven to be advantageous. The support arm is expediently arranged between the bearing arms and is designed in particular to extend parallel to the bearing arms to form a support head. In the blocking position of the retaining clip, the support head is conveniently arranged in a correspondingly designed head holder in the outer circumference of the clamp cage. Together with the head holder, the support head forms a stop so that radial displacement of the retaining clip from the insertion position beyond the blocking position is blocked by the support head bearing against the head holder. In particular, versions with two or more support arms have a corresponding number of head holders.

In a further developed version of the connector, the retaining clip has at least one guide pin, which is arranged between the retaining arms. Preferably, the guide pin is designed to extend parallel to the retaining arms towards a support end. It has proven to be advantageous that in the blocking position of the retaining clip, the guide pin rests with its support end against an outer circumference of the clamp cage. Corresponding to the support arms, the guide pin forms a stop together with the outer circumference of the clamp cage, so that a radial displacement of the retaining clip from the insertion position beyond the blocking position is blocked by the contact of the support head with the head holder.

For better assembly and, in particular, better guidance of the retaining clip, the clamp cage has a guide channel that corresponds to the guide pin. In the blocking position of the retaining clip, the guide pin protrudes into the guide channel so that the retaining clip cannot twist and/or wedge when moving between the blocking position and the insertion position.

Conveniently, the guide channel extends through two bearing bases, which are preferably designed in such a way that, when the clamp cage is mounted in the receptacle channel, the bearing bases ensure an advantageous distance between the collar of the clamp cage and the end of the base element pointing against the mounting direction.

With regard to improved disassembly, a preferred variant of the invention provides that the retaining clip has at least one, in particular two, radially elastic gripping arms located opposite one another. Conveniently, the gripping arms extend from a section formed on the connecting section and/or the retaining arms in the direction of the free ends of the retaining arms. In particular, the gripping arms are each formed with an end section radially spaced from the retaining arms, so that the gripping arms can be elastically deformed towards the retaining arms with a force acting radially on the end section. The gripper arms offer a preferred gripping contour for gripping with a hand or a tool, in particular for transferring the retaining clip from the blocking position to the insertion position.

It has proven to be particularly advantageous that the clamp cage is held in the receptacle channel in a positive-locking manner by means of at least one, in particular two opposing, latching arms. The latching arm is advantageously radially elastic and has a radially outwardly projecting latching extension. Advantageously, the latching extension engages in a positive-locking manner in a recess in a circumferential wall of the sleeve section when inserted, so that the clamp cage is held in the sleeve section. For this purpose, the latching arm is preferably formed on the outer circumference of the clamp cage.

A further alternative or supplementary design for retaining the clamp cage in the receptacle channel provides for the retaining clip to have at least one pin between the bearing arms that protrudes radially towards the through opening. The sleeve section and the clamp cage each have at least one through opening radial to the mounting direction. Conveniently, in an inserted state of the clamp cage in the sleeve section, a through opening of the clamp cage and the sleeve section are each arranged in alignment with one another, so that the retaining clip with the pin can be inserted radially to the mounting direction through the through opening of the clamp cage and the sleeve section. In the inserted position of the pin in the through openings, the pin blocks in a positive-locking manner so that the clamp cage is displaced axially in relation to the receptacle channel.

Further advantageous embodiments of the invention are shown in the following description of the figures and the dependent subclaims.

BRIEF DESCRIPTION OF THE DRAWINGS

FIG. 38a is a detailed view of area V as shown in FIG. 39.

In the various figures in the drawing, identical parts are always marked with the same reference symbols.

DETAILED DESCRIPTION

With regard to the following description, it is claimed that the invention is not limited to the embodiment examples and thereby not limited to all or several features of described feature combinations, rather each individual partial feature of the/each embodiment example is also of significance for the object of the invention independently of all other partial features described in connection therewith, and also in combination with any features of another embodiment example.

Figure 1:
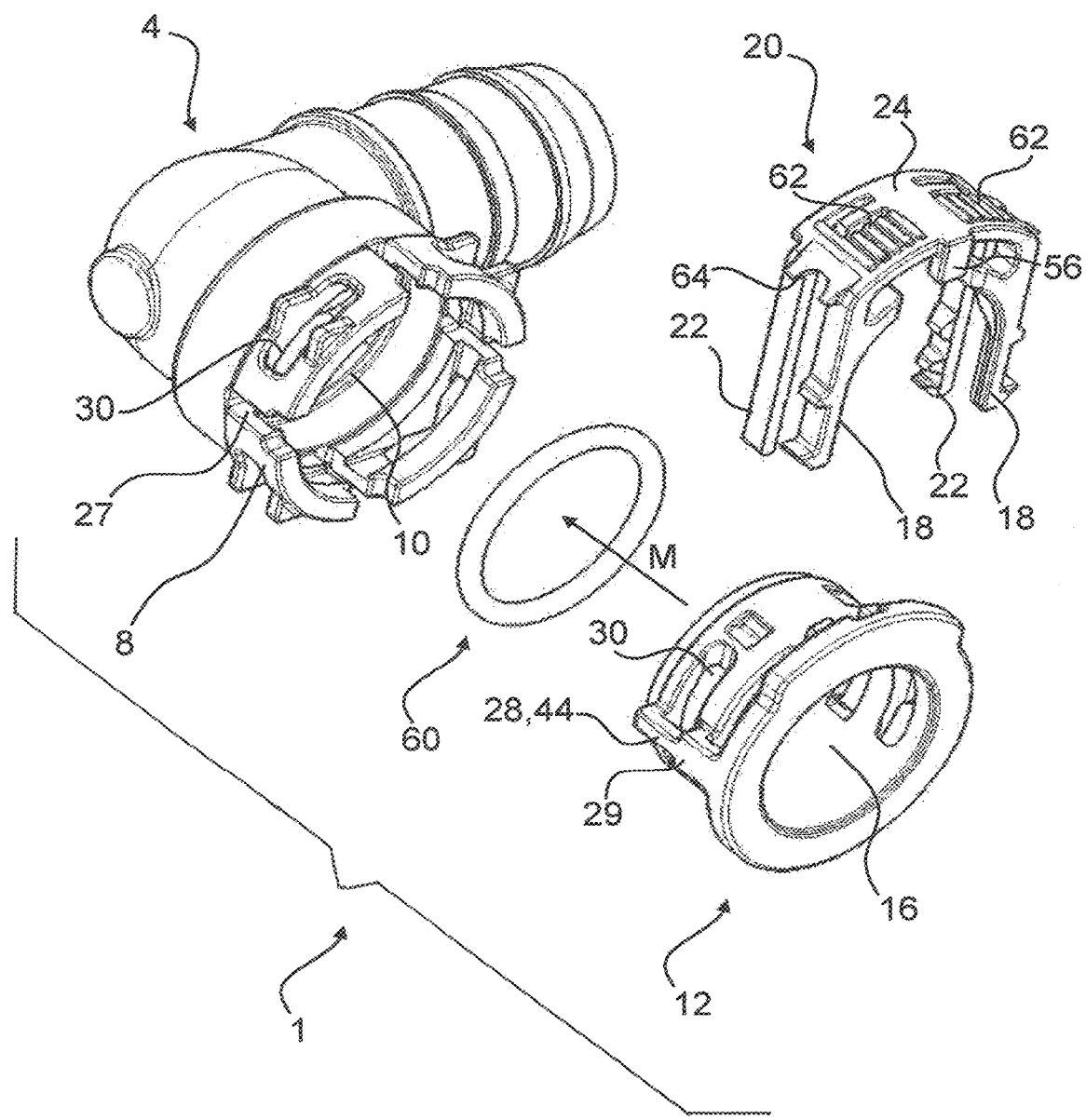
FIG. 1 is an exploded view of a connector according to the invention.
Figure 16:
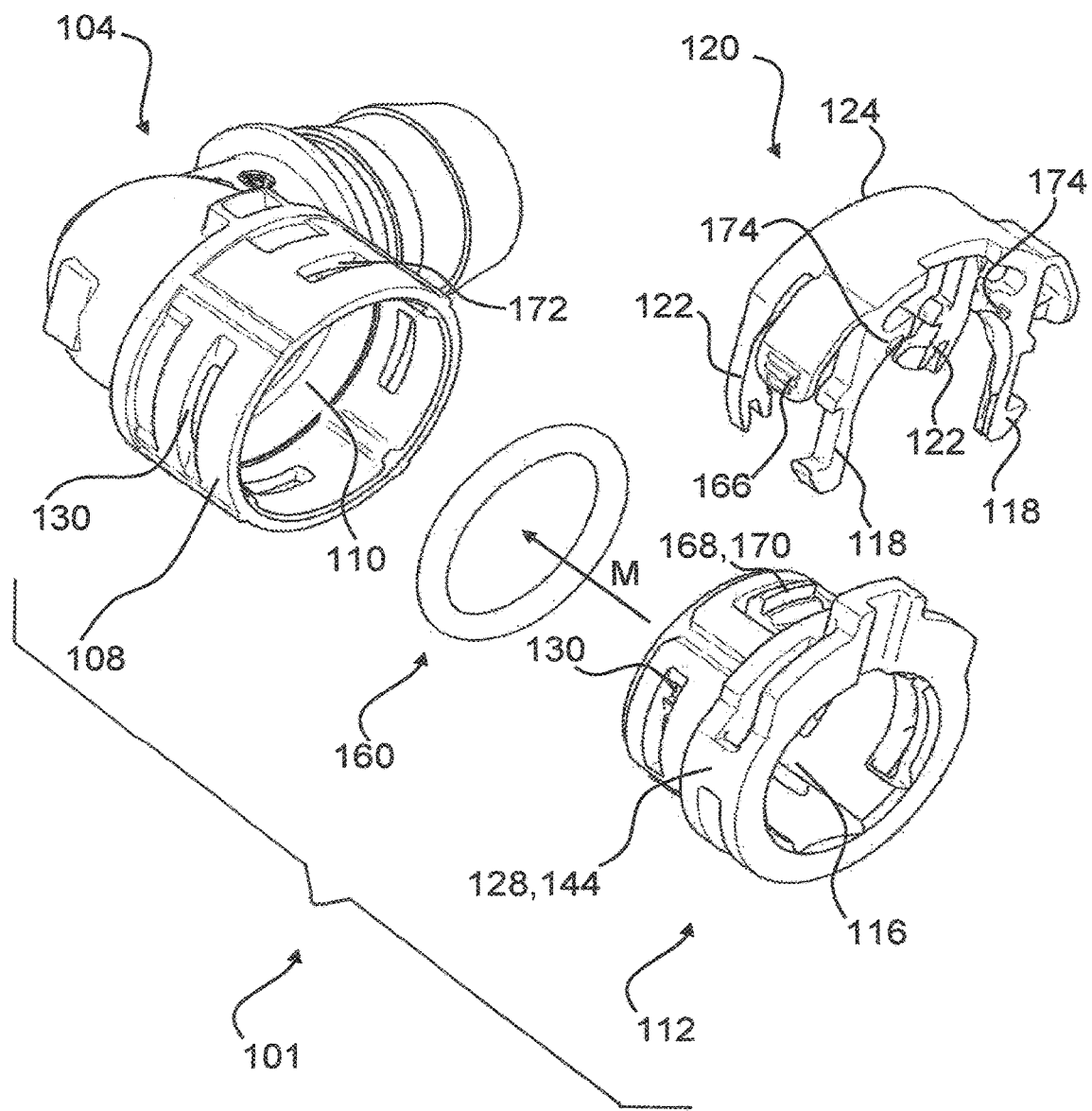
FIG. 16 is an exploded view of another connector according to the invention.

FIGS. 1 and 16 show a connector 1, 101 for connecting a first fluid line to a mating connector 2. The mating connector 2 is shown in particular in FIGS. 4, 7, 10, 13, 19, 22, 25, 28, 31, 34, 37 and 39 in conjunction with the connector 1, 101, 201.

The connector 1, 101, 201 has a base element 4, 104, 204 shown in FIGS. 1, 16, 37 and 39 with a through channel 6, 106, 206. In particular, it is shown in FIGS. 4, 19, 22 and 37 that the through channel 6, 106, 206 is fluidically connected to an end of the base element 4, 104, 204 formed as a sleeve section 8, 108, 208.

A clamp cage 12, 112, 212 is arranged in a receptacle channel 10, 110, 210 of the sleeve section 8, 108, 208. The clamp cage 12, 112, 212 can be detachably arranged in the receptacle channel 10, 110, 210. The clamp cage 12, 112, 212 is shown in particular in FIGS. 2, 17 and 35. As indicated in FIGS. 1 and 16, the clamp cage 12, 112, 212 can be inserted into the receptacle channel 10, 110, 210 of the sleeve section 8, 108, 208 in a mounting direction M and is held in a positive-locking manner axially to the mounting direction M.

The clamp cage 12, 112, 212 is retained in a through opening 16, 116, 216 of the sleeve section 8, 108, 208 by means of two retaining arms 18, 118, 218 of a retaining clip 20, 120, 220 which can be inserted into the clamp cage 12, 112, 212 perpendicular to the mounting direction M. The retaining clip 20, 120, 220 is shown in FIGS. 1, 3, 16, 18 and 36.

The two retaining arms 18, 118, 218 of the retaining clip 20, 120, 220 are designed to course parallel to one another and project into the through opening 16, 116, 216 of the clamp cage 12, 112, 212 in a rest state of the retaining clip 20, 120, 220. Furthermore, the retaining arms 18, 118, 218 are designed to be elastically expandable radially to the through opening 16, 116, 216 into a tension state.

The retaining clip 20, 120, 220 is designed to be displaceable radially to the through opening 16, 116, 216 from an insertion position, shown in particular in FIGS. 5, 6, 8, 9, 11, 12, 20, 21, 23, 24, 26, 27, 29 and 30, into a blocking position, shown in FIGS. 14, 15, 32, 33, 39, and from the blocking position into the insertion position.

Figure 14:
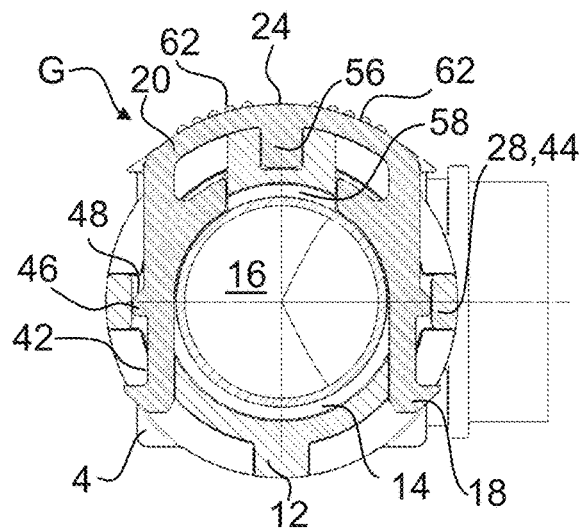
FIG. 14a is a sectional view along the parting line G-G as shown in FIG. 13.
Figure 32:
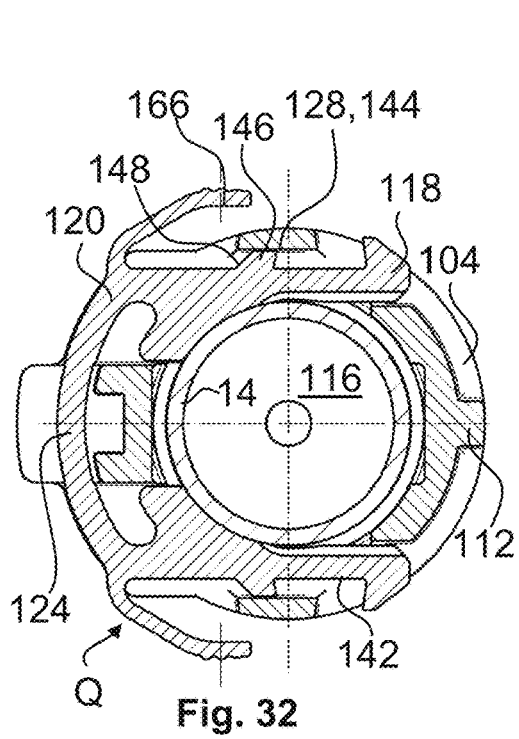
FIG. 32a is a sectional view along the parting line Q-Q as shown in FIG. 31.

The retaining arms 18, 118, 218 are expandable into their tension state in the insertion position of the retaining clip 20, 120, 220. Furthermore, the retaining arms 18, 118, 218 are blocked against expansion into the tension state in the blocking position of the retaining clip 20, 120, 220, as shown in FIGS. 14 and 32.

According to the invention, the retaining clip 20, 120, 220 has, as shown in particular in FIGS. 3, 6, 9, 12, 15, 18, 21, 24, 27, 30 and 33, 36, two bearing arms 22, 122, 222 which are elastic radially to the through opening 16, 116, 216. The bearing arms 22, 122, 222 thereby fix the clamp cage 12, 112, 212 in the receptacle channel 10, 110, 210 of the sleeve section 8, 108, 208 in a positive-locking manner axially to the mounting direction M and, according to the invention, project into the through opening 16, 116, 216 of the clamp cage 12, 112, 212 in a rest state of the bearing arms 22, 122, 222. Furthermore, it is part of the invention that the bearing arms 22, 122, 222, as shown in FIGS. 9, 12, 27 and 30, are designed to be elastically expandable radially to the through opening 16, 116, 216 into a tension state.

Conveniently, while the bearing arms 22, 122, 222 are in the rest state and the retaining clip 20, 120, 220 is in the insertion position, the retaining clip 20, 120, 220 is blocked against displacement from the insertion position to the blocking position. This embodiment is shown in particular in FIGS. 6, 21 and 23.

Figure 8:
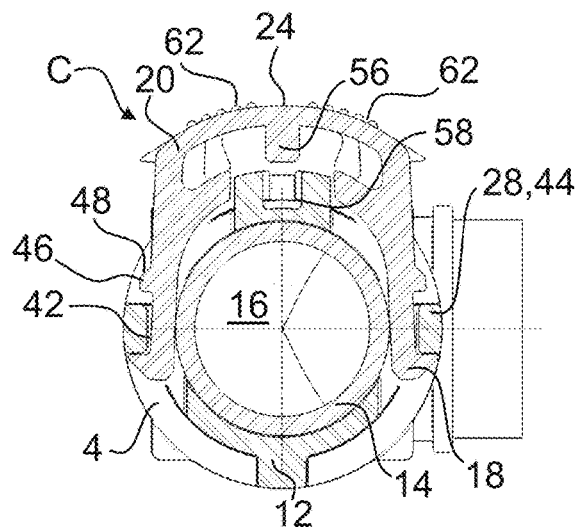
FIG. 8 is a sectional view along the parting line C-C as shown in FIG. 7.
Figure 23:
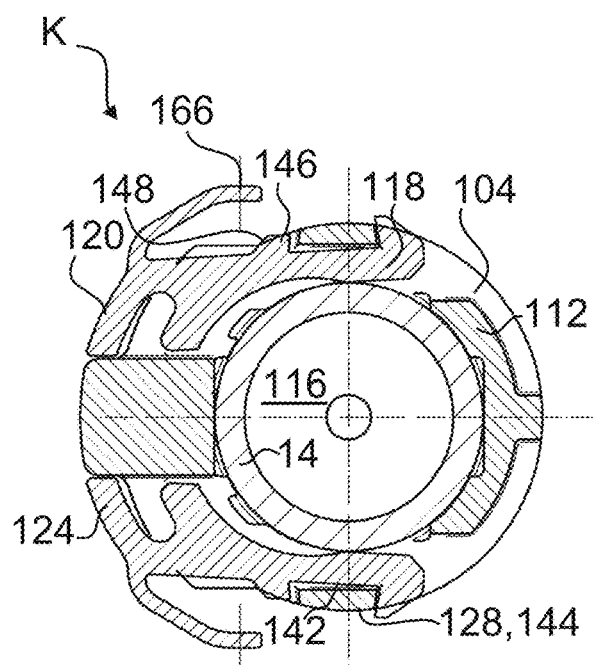
FIG. 23a is a sectional view along the parting line K-K as shown in FIG. 22.
Figure 26:
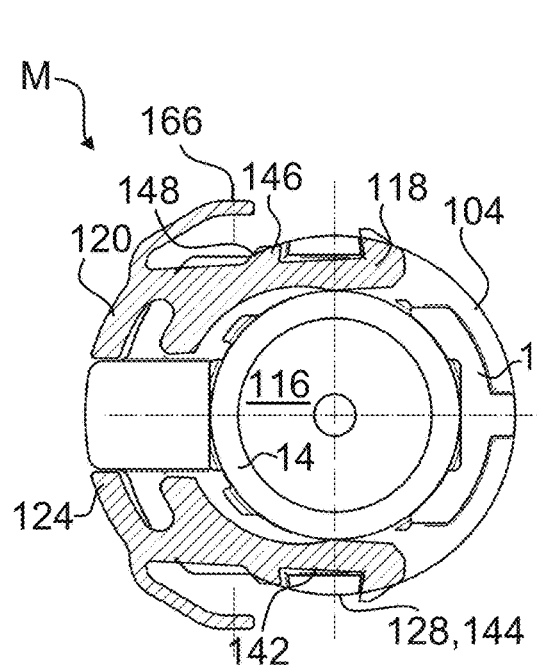
FIG. 26a is a sectional view along the parting line M-M as shown in FIG. 25.

Preferably, while the retaining arms 18, 118, 218 are in the tension state and the retaining clip 20, 120, 220 is in the insertion position, the retaining clip 20, 120, 220 is blocked against displacement from the insertion position to the blocking position as shown in FIGS. 8, 23 and 26.

Figure 15:
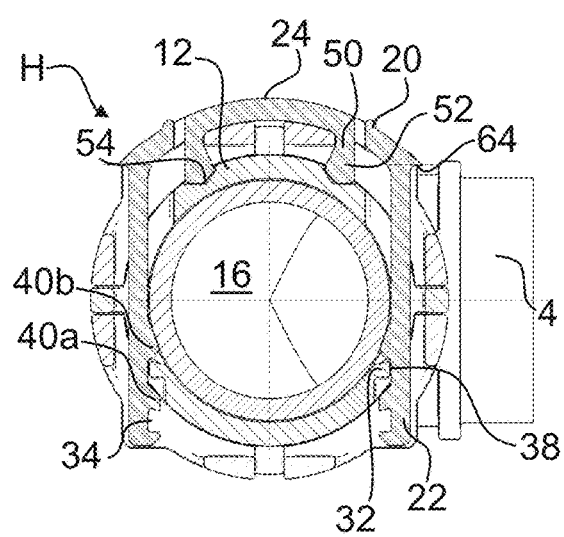
FIG. 15a is a sectional view along the parting line H-H as shown in FIG. 13.
Figure 33:
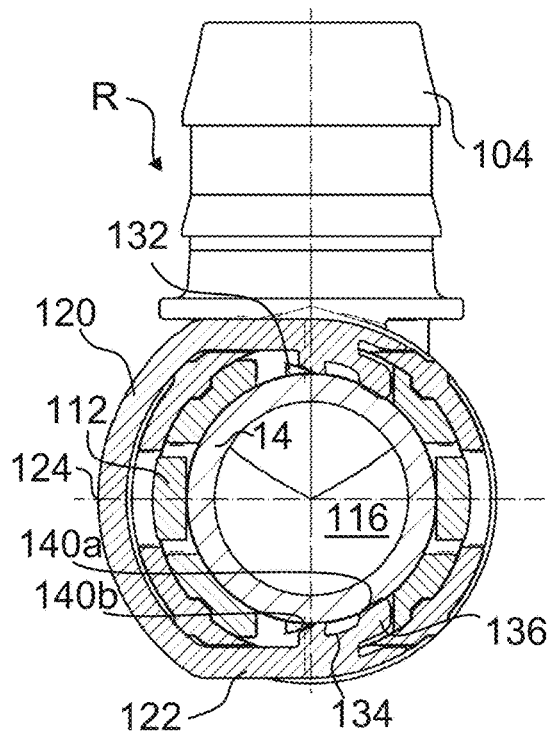
FIG. 33a is a sectional view along the parting line R-R as shown in FIG. 31.
Figure 34:
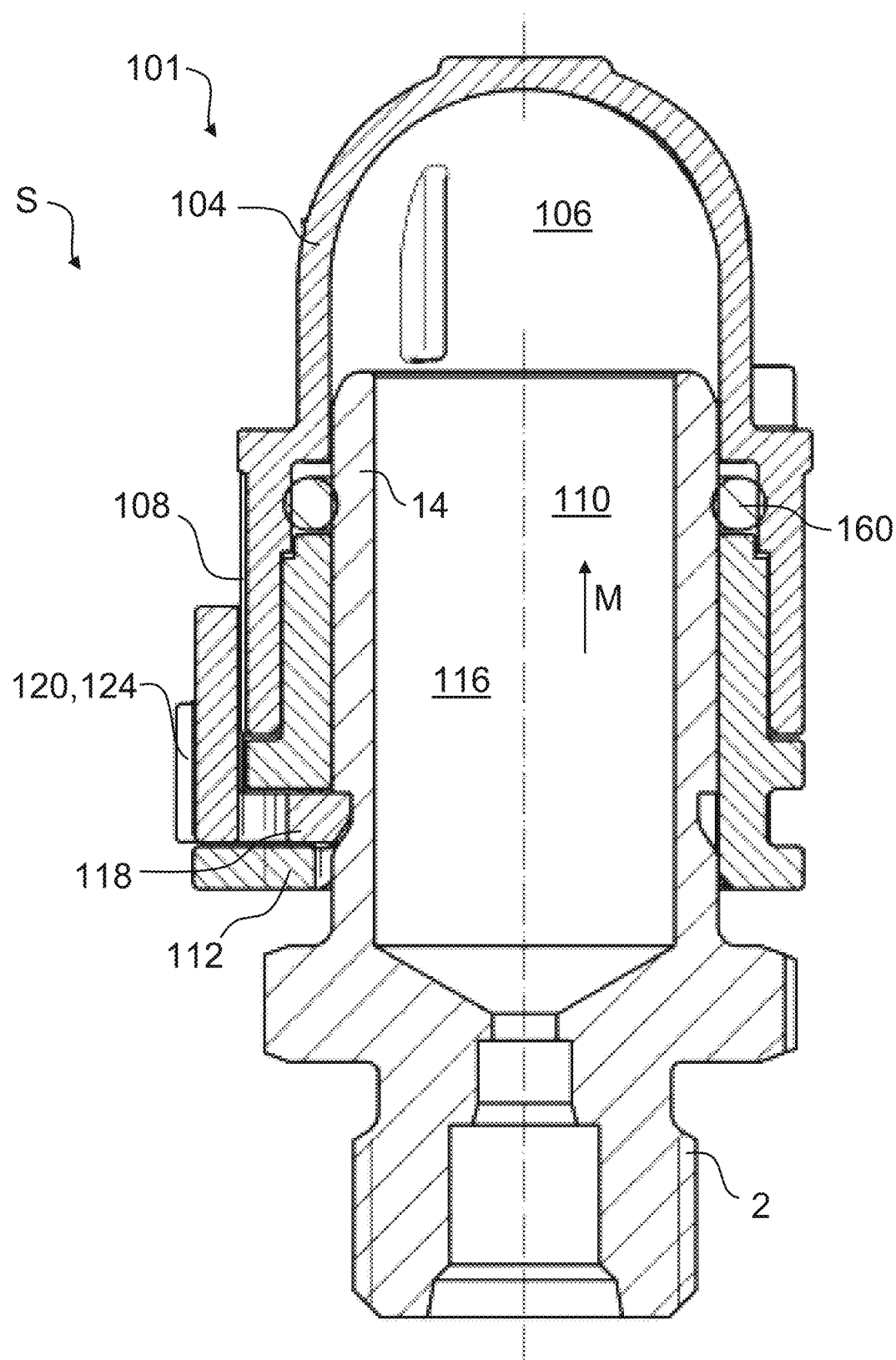
FIG. 34 is a sectional view along the parting line S-S as shown in FIG. 31.
Figure 39:
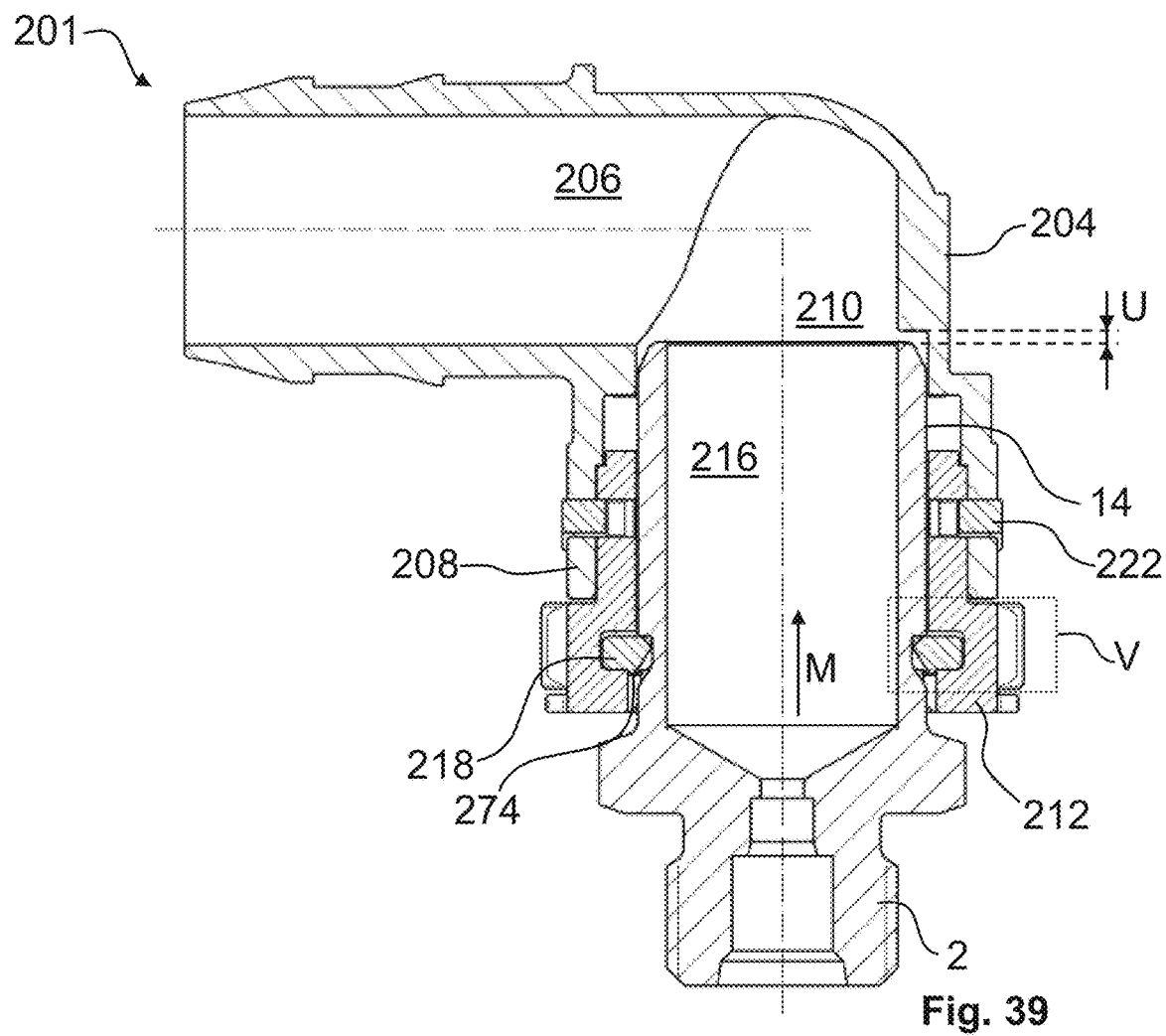
FIG. 39a is a sectional view along a mounting direction of a mating connector according to the invention with a fully inserted mating connector with a system pressure load.

As shown in FIGS. 15, 33 and 39, while the bearing arms 22, 122, 222 are in the rest state and the retaining clip 20, 120, 220 is in the blocking position, the retaining clip 20, 120, 220 is positively locked against displacement from the blocking position to the insertion position.

Figure 3:
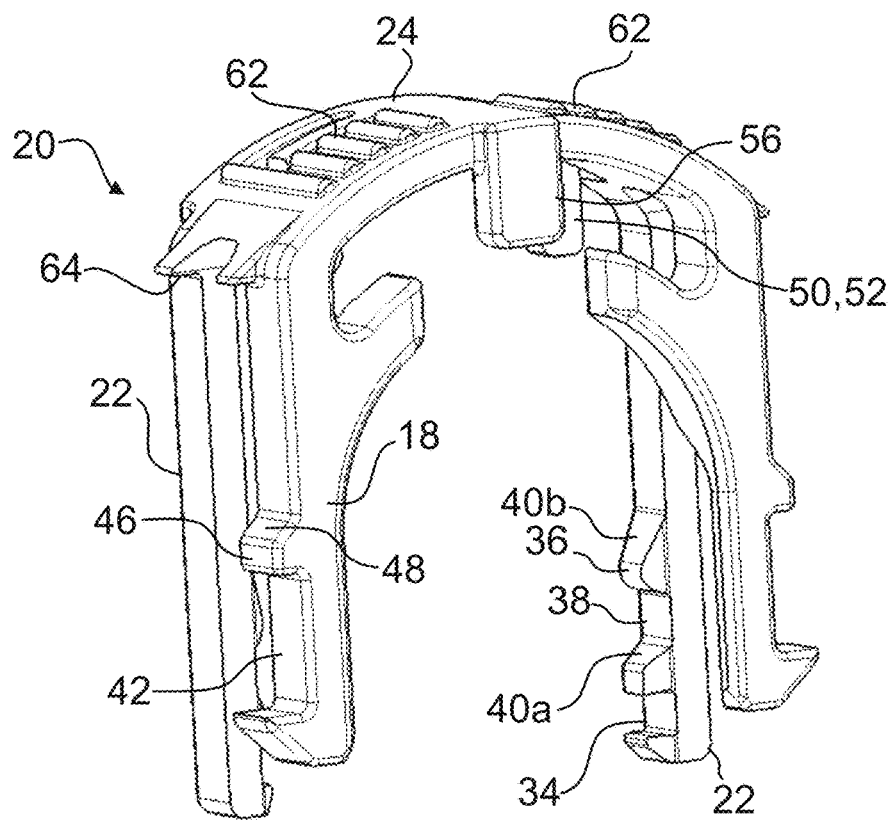
FIG. 3 is a perspective view of a retaining clip according to the invention.
Figure 4:
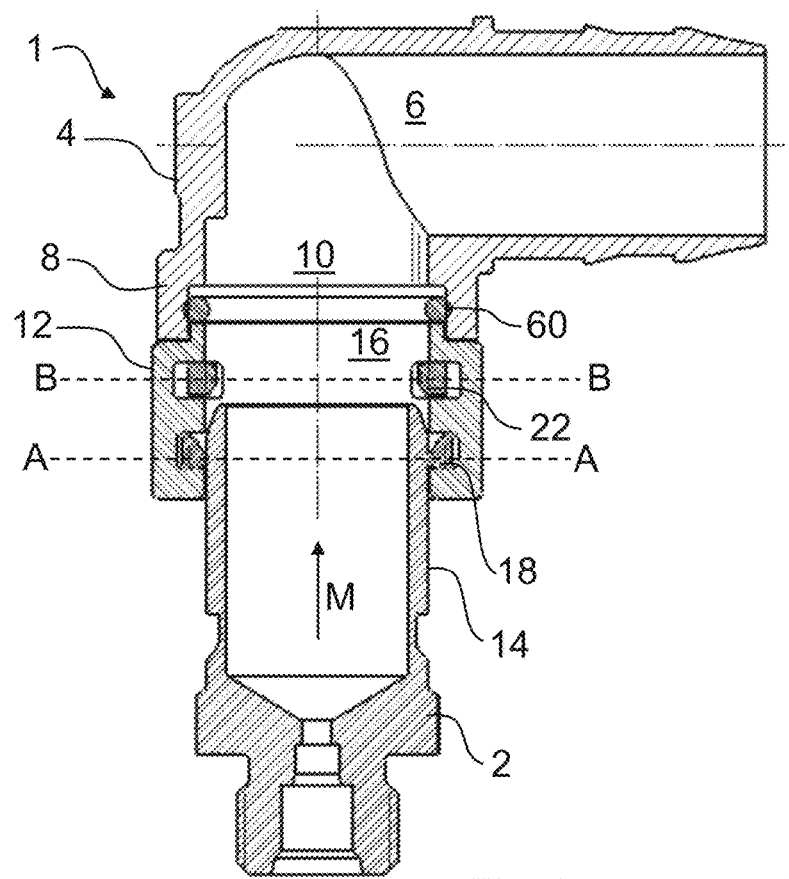
FIG. 4 is a sectional view along a mounting direction of a connector according to the invention with a partially inserted mating connector in a first mounted state with the retaining clip in the insertion position.
Figure 18:
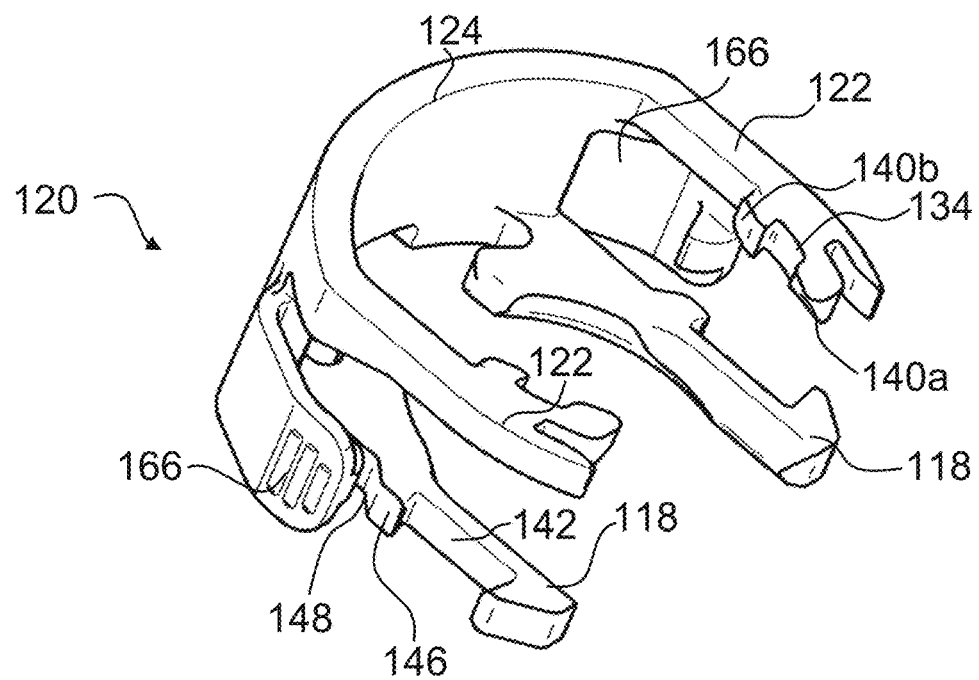
FIG. 18a is a perspective view of another retaining clip according to the invention.
Figure 36:
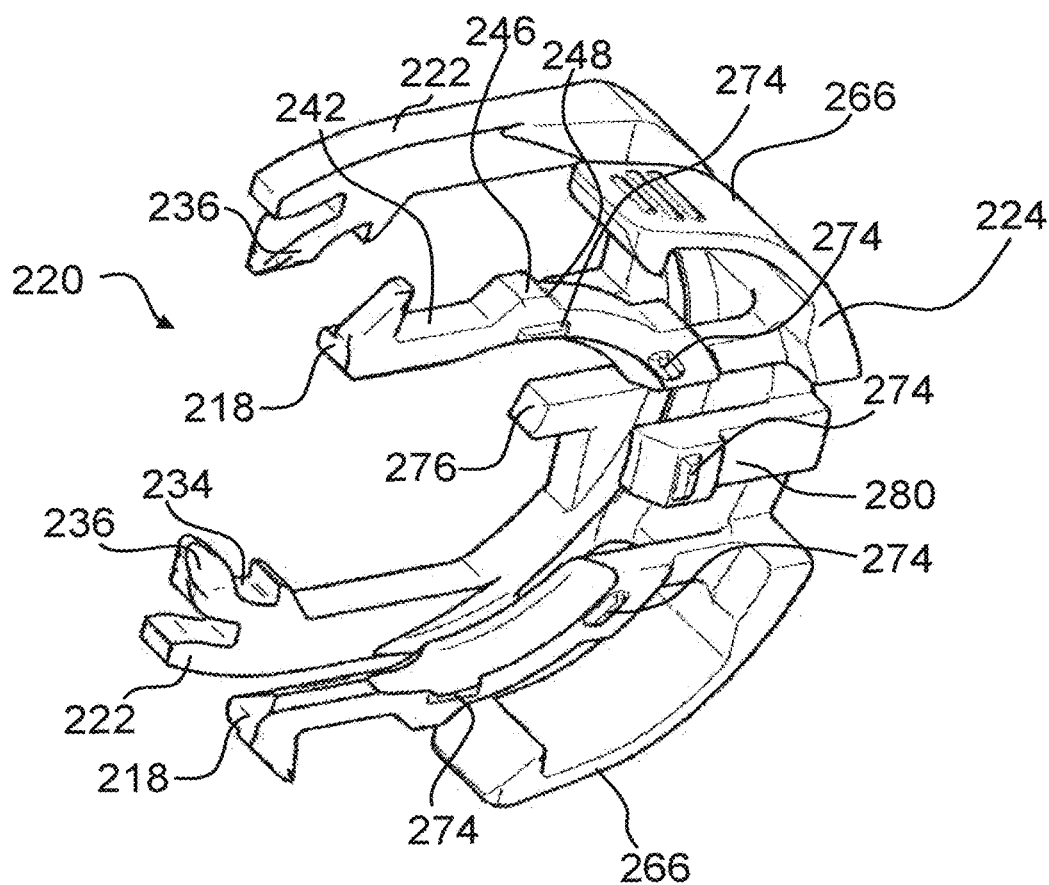
FIG. 36a is a perspective view of another retaining clip according to the invention.

In a particular embodiment of the invention, the retaining clip 20, 120, 220 is U-shaped as shown in FIGS. 3, 18 and 36. Expediently, the bearing arms 22, 122, 222 and the retaining arms 18, 118, 218 are connected via a connecting section 24, 124, 224 and extend in the same direction preferably from the connecting section 24, 124, 224 to a free end in each case. In particular, the bearing arms 22, 122, 222 and the retaining arms 18, 118, 218 are arranged axially spaced from each other. As shown in FIGS. 3, 18 and 36, a gap is preferably formed in each case between a retaining arm 18, 118, 218 and an axially offset bearing arm 22, 122, 222, which gap extends in each case from the free ends to the connecting section 24, 124, 224.

An advantageous variant of the retaining clip 120, 220 is shown in particular in FIGS. 16 and 36. Expediently, the retaining clip 120, 220 has at least two pressure locking humps 274 formed on the retaining arms 118, 218 and/or on the connecting section 124, 224 on the side facing towards the mounting direction M. A preferred variant with two pressure locking humps 174 on the connecting section 124 is shown as an example in FIG. 16. An extended embodiment, which is shown as an example in FIG. 36, has, in addition to these two pressure locking humps 274 on the connecting section 224, two additional pressure locking humps 274 on the retaining arms 220. Furthermore, it may be provided that three pressure locking humps 274 are arranged on the connecting section 224 and two pressure locking humps 274 are arranged on the retaining arms 218, as shown in FIG. 36.

Advantageously, the pressure locking humps 174, 274 are designed to protrude towards the mounting direction M such that in the blocking position of the retaining clip 120, 220 the pressure locking humps 174, 274 can be supported radially to the through opening 116, 216 against an inner circumferential wall of the through opening 116, 216.

In particular, two pressure-locking humps 274 on the retaining arms 218 are formed and arranged opposite each other in such a way that the pressure-locking humps 274 are arranged within the through opening 216 in the blocking position of the retaining clip 220 and the rest state of the retaining arms 218 on an axis of symmetry of the through opening 216, which extends in particular perpendicularly to the direction of displacement of the retaining clip 220.

Figure 40:
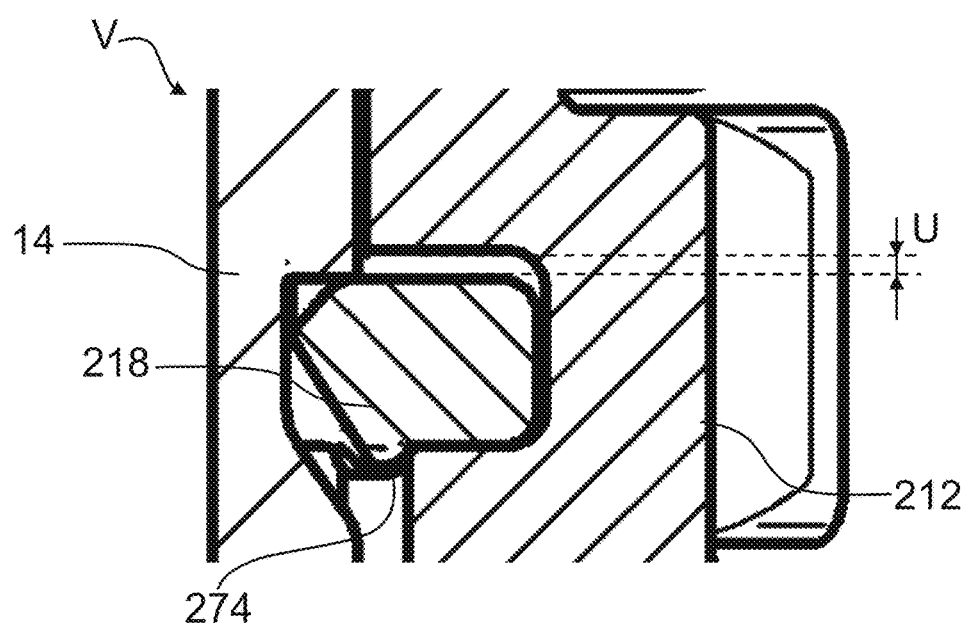

In order to block the radial displacement of the retaining clip 120, 220 from the blocking position to the insertion position and/or a radial expansion of the retaining arms 118, 218, in particular in the event of a system pressure load, which is generated during operation by the supplying fluid, the pressure locking humps 174, 274 have proven to be particularly advantageous. In particular, when a mating connector 2 is fully inserted into the connector 101, 201, the retaining clip 120, 220 is axially displaced against the mounting direction under a system pressure load in such a way that the pressure locking humps 174, 274 are arranged in a gap between the plug shank 14 and the circumferential wall of the through opening 116, 216. As shown in FIGS. 39 and 40, the pressure locking humps 174, 274 block the retaining arms 118, 218 from expanding radially into their tension state and/or the retaining clip 120, 220 from being transferred from the blocking position to the insertion position. Unintentional release of the retaining clip 120, 220 or the mating connector 2 is thus counteracted by means of the pressure locking humps 174, 274.

As shown in FIGS. 39 and 40, the retaining clip 220 is also designed such that, when the mating connector 2 is fully inserted and is under system pressure, the retaining clip 220 rests axially with an area of the side facing towards the mounting direction M adjacent to the pressure locking humps 274 on a bearing surface of the clamp cage facing in the mounting direction M and rests radially against a circumferential wall of the through opening 216 with the pressure locking humps 274.

It has proven to be expedient that the base element 104, 204 respectively the clamp cage 112, 212 is dimensioned with an overlap path for the plug shank 14. The overlap path U is characterized by way of example in FIGS. 37 and 39. Furthermore, the retaining clip 120, 220 suitably has an axial play relative to the clamp cage 112, 212. Preferably, the axial play corresponds at least to the extension of the pressure locking humps 174, 274 in the axial direction.

Figure 37:
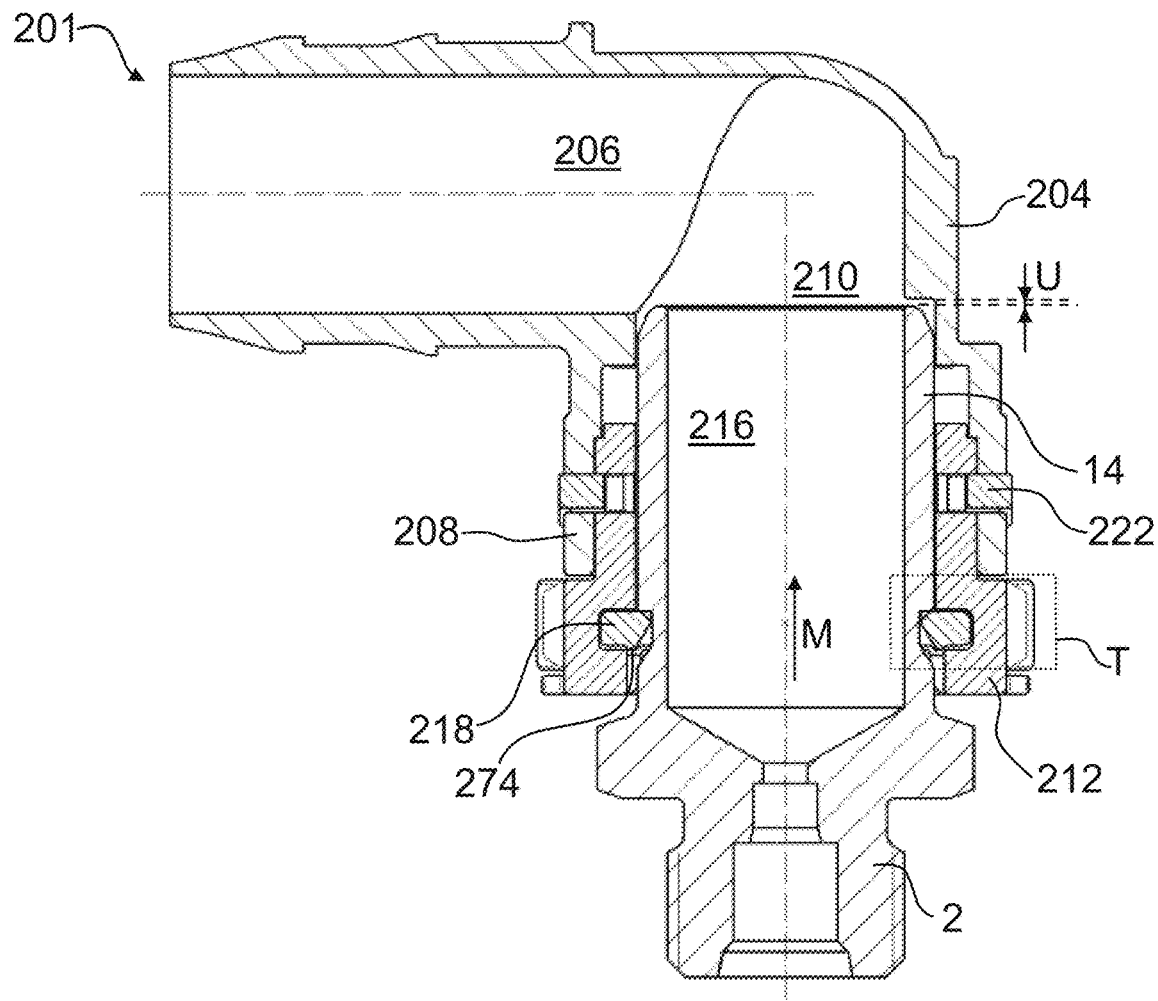
FIG. 37a is a sectional view along a mounting direction of a mating connector according to the invention with a fully inserted mating connector without a system pressure load.
Figure 38:
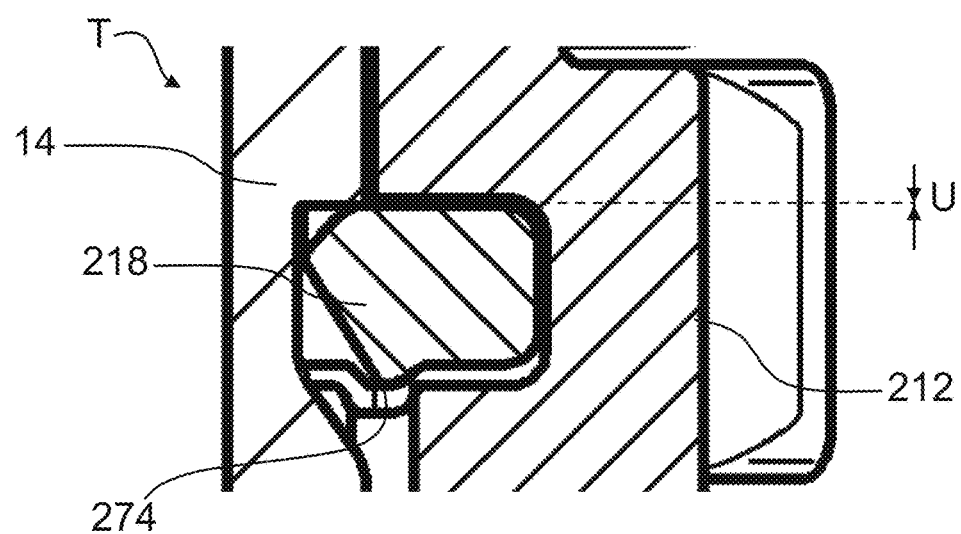
FIG. 38a is a detailed view of area T according to FIG. 37.

For the purpose of assembly, the retaining clip 120, 220 can be transferred from the insertion position to the blocking position by the play of the retaining clip 120, 220 with respect to the clamp cage 112, 212. When the mating connector 2 is fully inserted into the through opening 116, 216 and the latching connection with the mating connector 2 required for the full latching position is established by means of the retaining arms 118, 218, the mating connector 2 can displace the retaining clip 120, 220 via the retaining arms 118, 218 against the mounting direction M in accordance with its overlap path U by means of a restoring force on the mating connector 2 directed against the mounting direction M. FIGS. 37 and 38 show a state in which the mating connector 2 is fully inserted into the connector, including the overlap path U. FIGS. 39 and 40 show a state after the restoring force directed against the mounting direction M has been applied to the mating connector 2 and the mating connector 2 has displaced the retaining clip 220 axially against the mounting direction M in accordance with the play between the retaining clip 220 and the clamp cage 212. The restoring force can be brought about specifically during assembly or brought about during operation by a system pressure.

Advantageously, due to the axial displacement of the retaining clip 120, 220, the pressure locking humps 174, 274, as shown in FIGS. 39 and 40, arrange themselves radially next to the inner circumferential wall of the through opening 116, 216 and block the radial displacement of the retaining clip 120, 220 and the radial expansion of the retaining arms 118, 218. In order to release the latching connection respectively the blockage by the pressure-locking humps 174, 274, the mating connector 2, as shown in FIGS. 37 and 38, is expediently displaced in the mounting direction M into an overlapping position at least over the axial length of the pressure-locking humps 174, 274, so that the pressure-locking humps 174, 274 and the inner circumferential wall of the through opening 116, 216 do not overlap. The elastic deformation of the retaining arms 118, 218 and the radial displacement of the retaining clip 120, 220 are released again.

In a particular embodiment of the retaining clip 220, a locking pin 280 pointing radially towards the through opening 216 is formed on the connecting section 224 in such a way that, when the retaining clip 220 is in its blocking position, the locking pin 280 engages in a retaining groove of a mating connector 2 fully inserted into the connector 101, 201 and blocks the mating connector 2 in a positive-locking manner pointing towards the mounting direction M. Such an embodiment of the retaining clip 220 with a locking pin 280 is shown as an example in FIG. 36. Advantageously, at least one pressure locking hump 274 is arranged on the locking pin 280 pointing towards the mounting direction M. In particular, the locking pin 280 increases the holding force of the retaining clip 220 and relieves the latching arms 218 during the positive-locking blocking of a movement of the mating connector 2 against the mounting direction M.

Figure 2:
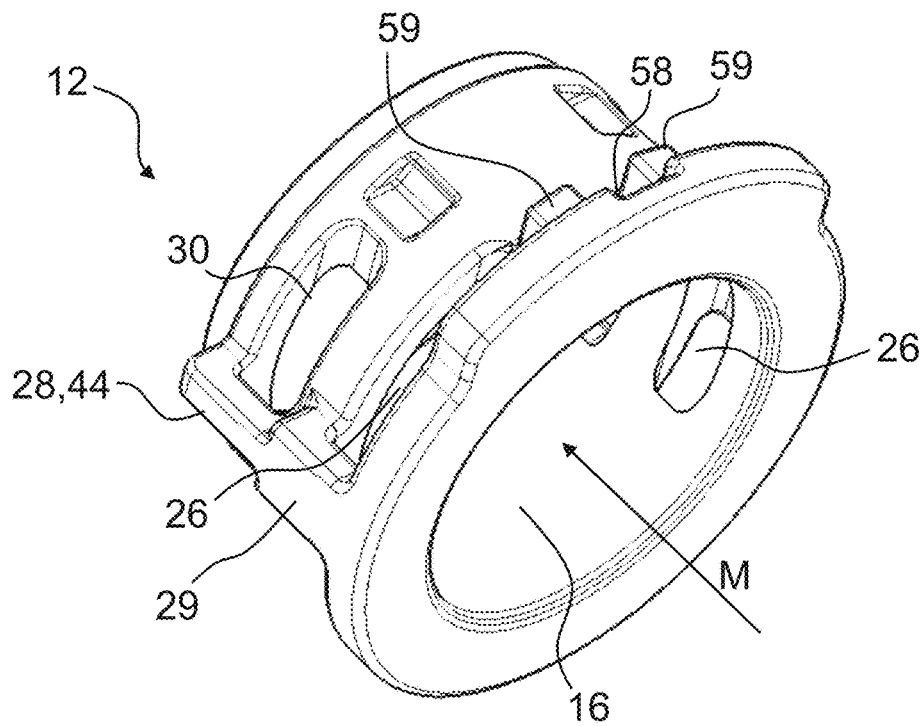
FIG. 2 is a perspective view of a clamp cage according to the invention.
Figure 17:
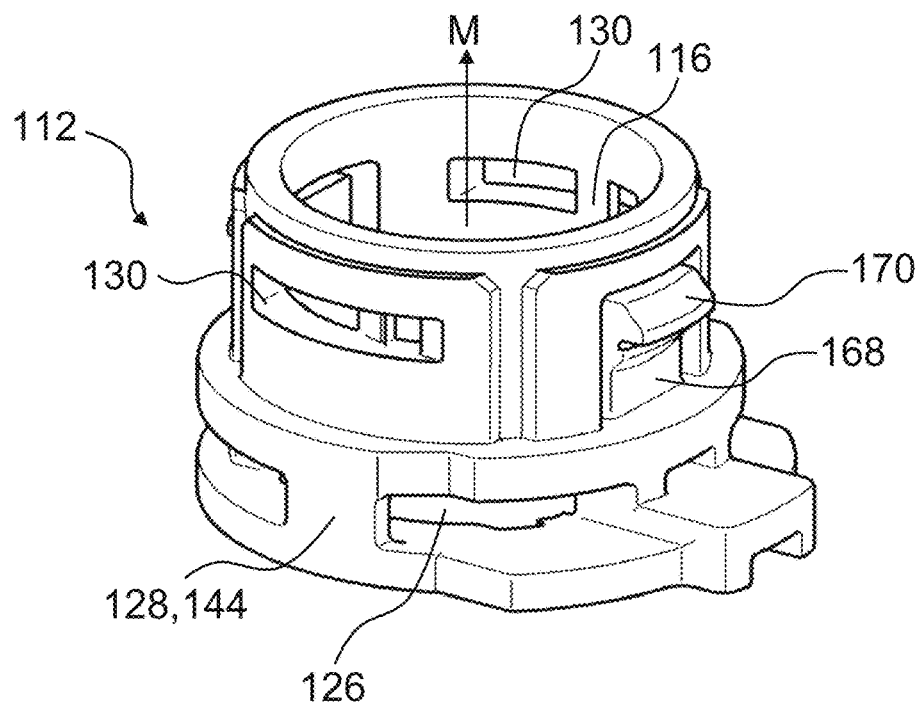
FIG. 17a is a perspective view of another clamp cage according to the invention.
Figure 35:
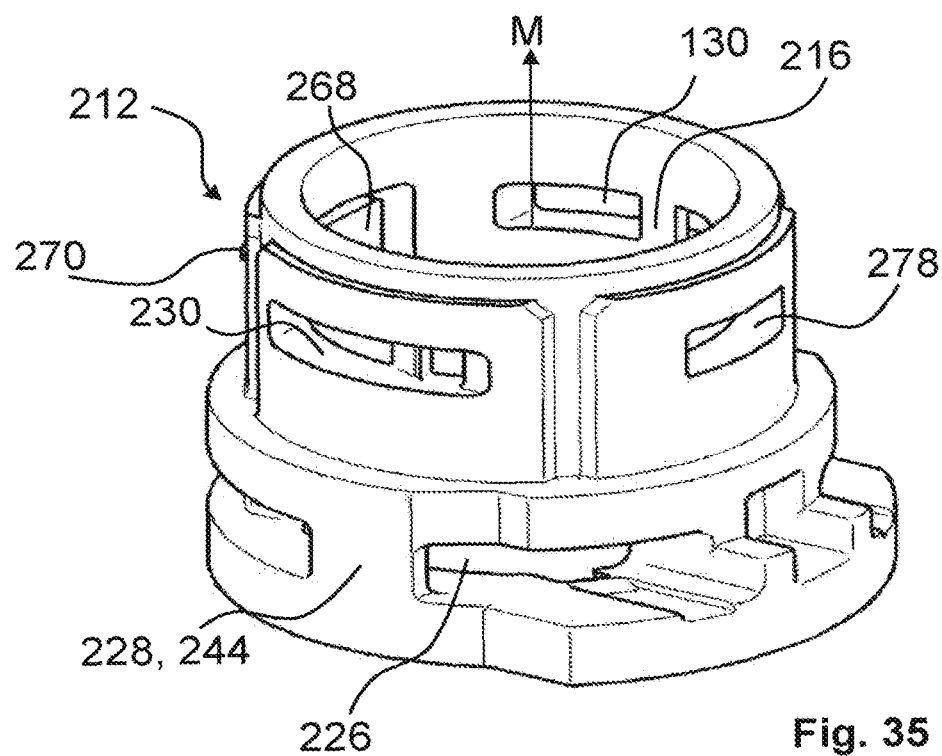
FIG. 35a is a perspective view of another clamp cage according to the invention.

As shown in FIGS. 2, 17 and 35, in a preferred variant the clamp cage 12, 112, 212 has two windows 26, 126, 226 which are open radially to the through opening 16, 116, 216. It is further preferred that a reinforcing strut 28, 128, 228 extending axially to the through opening 16, 116, 216 is arranged in each of the windows. According to the expedient embodiment shown in FIGS. 5, 8, 11, 14, 20, 23, 26, 29 and 32, the retaining arms 18, 118, 218 engage through the windows 26, 126, 226 in such a way that the retaining arms 18, 118, 218 are arranged radially between the through opening 16, 116, 216 and the reinforcing struts 28, 128, 228. In particular, the retaining arms 18, 118, 218 project into the through opening 16, 116, 216 of the clamp cage 12, 112, 212, at least in the rest state, as shown by way of example in FIGS. 11, 14, 20, 29 and 32.

Particularly advantageously, the base element 4 has four axial guide slots 27 distributed over the circumference, which are arranged offset by 90° relative to each other and open towards the mounting direction M. The reinforcing struts 28 are advantageously designed with a radial projection towards the clamp cage 12 in such a way that the reinforcing struts 28 engage in the guide slots 27 to arrange the clamp cage 12 in the receptacle channel 10 and block rotation.

Conveniently, the reinforcing struts 28 are formed with a socket 29 in such a way that, in a state of the clamp cage 12 mounted in the receptacle channel 10, the sockets 29 ensure an advantageous distance between a collar of the clamp cage 12 and an end of the base element 4 pointing against the mounting direction M.

A further advantageous embodiment of the connector 1, 101, 201 is shown in FIGS. 6, 9, 12 15, 21, 24, 27, 30, 33 and 35. According to this optional embodiment, the sleeve section 8, 108, 208 and the clamp cage 12, 112, 212 each have at least two breakthroughs 30, 130, 230 radial to the mounting direction M. According to the illustrated embodiment, preferably one breakthrough 30, 130, 230 each of the clamp cage 12, 112, 212 and the sleeve section 8, 108, 208 are arranged in alignment with one another in an inserted state of the clamp cage 12, 112, 212 in the sleeve section 8, 108, 208. Conveniently, the breakthroughs 30, 130, 230 are arranged relative to one another in such a way that the retaining clip 20, 120, 220 can be inserted with the bearing arms 22, 122, 222 radially to the mounting direction M through the breakthroughs 30, 130, 230 of the clamp cage 12, 112, 212 and the sleeve section 8, 108, 208 into the through opening 16, 116, 216 of the clamp cage 12, 112, 212.

FIGS. 2, 17 and 35 show a preferred variant of the invention, according to which the radially open windows 26, 126, 226 for arranging and passing through the retaining arms 18, 118, 218 are arranged axially to the mounting direction M at a distance from the breakthroughs 30, 130, 230 for arranging and passing through the bearing arms 22, 122, 222. Preferably, the windows 26, 126, 226 and the breakthroughs 30, 130, 230 are arranged axially one behind the other, in particular without an angular offset, around the through opening.

Figure 6:
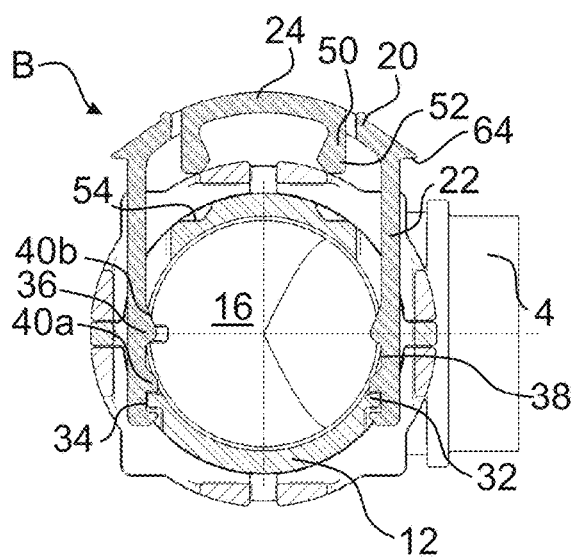
FIG. 6 is a sectional view along parting line B-B as shown in FIG. 4.
Figure 7:
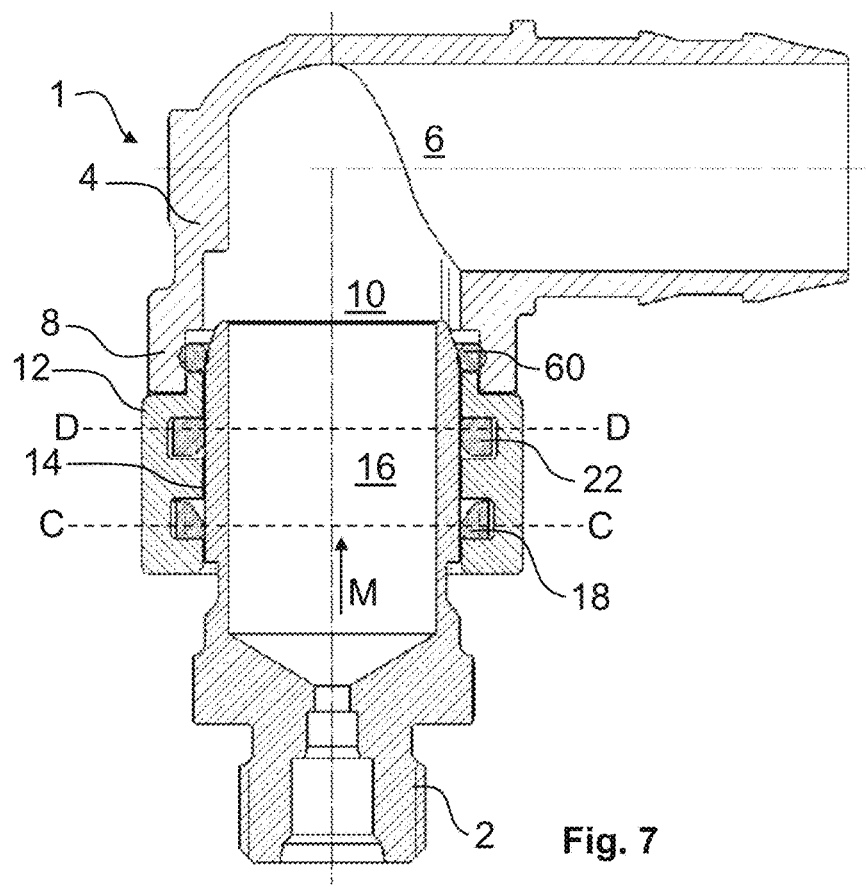
FIG. 7 is a sectional view along a mounting direction of a connector according to the invention with a partially inserted mating connector in a second mounted state with the retaining clip in the insertion position.
Figure 21:
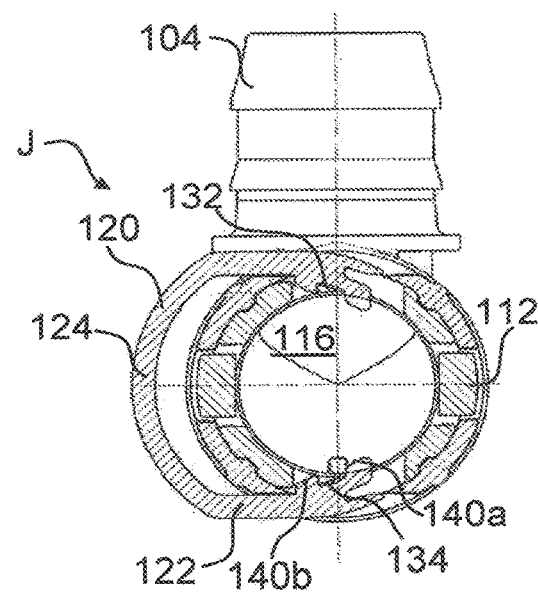
FIG. 21a is a sectional view along parting line J-J as shown in FIG. 19.
Figure 22:
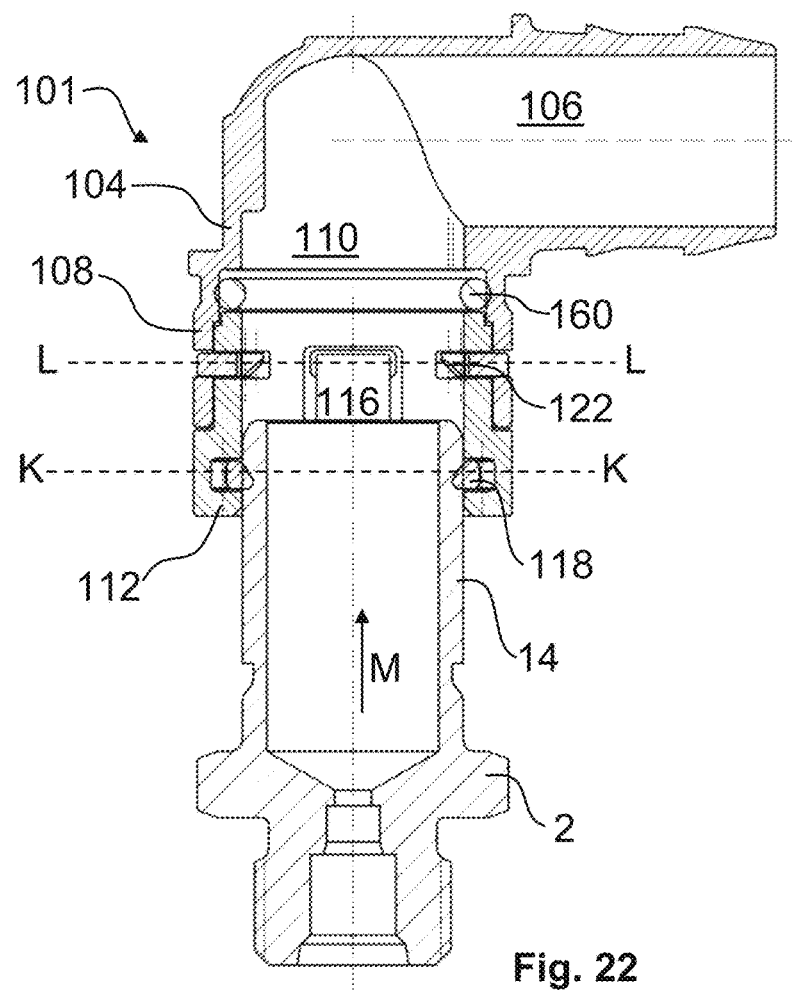
FIG. 22a is a sectional view along a mounting direction of a connector according to the invention with a partially inserted mating connector in a second mounted state with the retaining clip in the insertion position.
Figure 24:
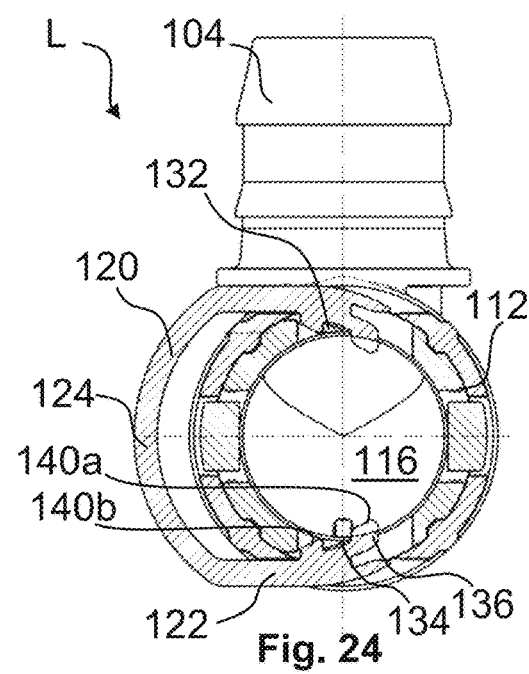
FIG. 24a is a sectional view along the parting line L-L as shown in FIG. 22.
Figure 25:
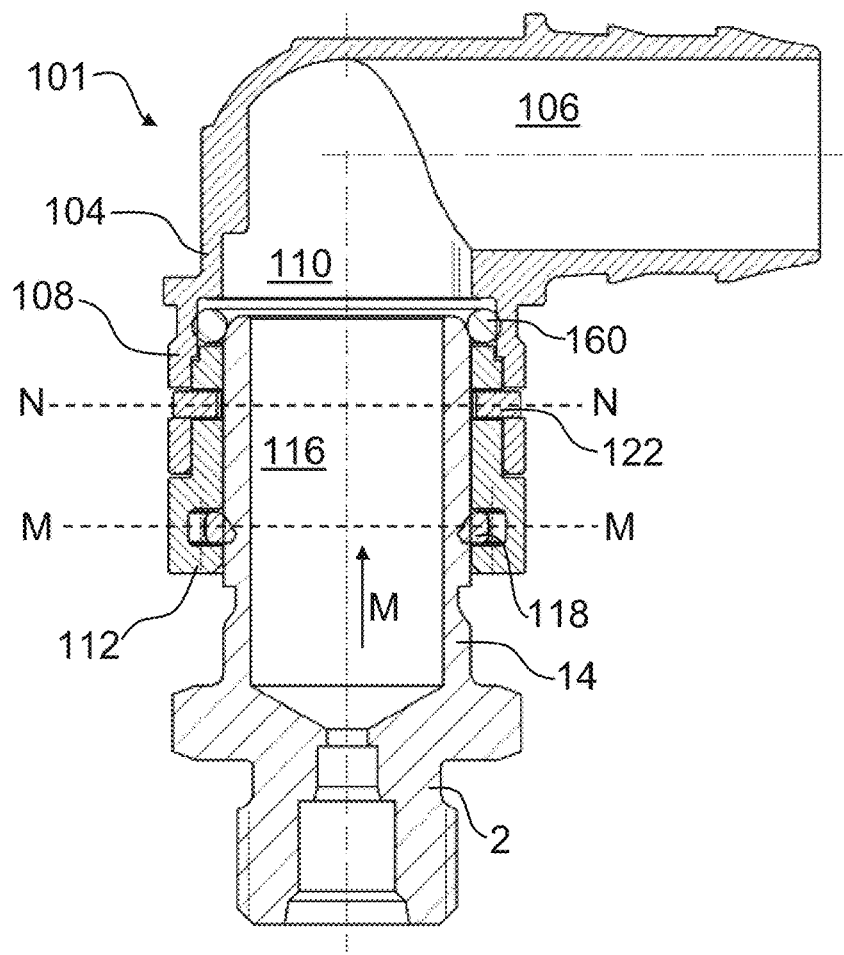
FIG. 25a is a sectional view along a mounting direction of a connector according to the invention with a partially inserted mating connector in a third mounted state with the retaining clip in the insertion position.

Another optional embodiment is shown in FIGS. 3, 6, 9, 12, 15, 21, 24, 27, 30 and 33. Advantageously, the clamp cage 12, 112 has radially outwardly facing detents 32, 132. In particular, the bearing arms 22, 122, 222 have bearing grooves 34, 134, 234 which correspond to the detent means 32, 132, in particular which are open radially inwards. Advantageously, the detent means 32, 132 engage in the bearing grooves 34, 134, 234 in the rest state of the bearing arms 22, 122, 222 and the insertion position of the retaining clip 20, 120, 220. Advantageously, the detents 32, 132 positively-locking block a displacement of the retaining clip 20, 120, 220 from the insertion position to the blocking position in the rest state of the bearing arms 22, 122, 222. The bearing arms 22, 122, 222 according to this variant of the invention are shown in FIGS. 6, 21 and 24 in an insertion position of the retaining clip 20, 120. In particular, the clamp cage 212 shown in FIG. 36 and the retaining clip 220 shown in FIG. 35 can be designed in accordance with this embodiment.

Expediently, in a further developed embodiment, the bearing arms 22, 122, 222 have radially inwardly pointing expanding means 36, 136, 236. This embodiment is shown in particular in FIGS. 3, 6, 9, 21, 24, 27, 30, 33 and 36. In the insertion position of the retaining clip 20, 120, 220 and the rest state of the bearing arms 22, 122, 222, as shown in FIGS. 6, 21 and 24, the expanding means 36, 136, 236 project into the through opening 16, 116, 216 in such a way that the bearing arms 22, 122, 222 are expandable from the rest state into the tension state via the expanding means 36, 136, 236 when the mating connector 2 is inserted in the mounting direction M. The bearing arms 22, 122 in the tension state are shown in FIGS. 9, 12, 27, 30 and 33.

According to a preferred reaction to the radial elastic expansion of the bearing arms 22, 122, 222 into the tension state, the detents 32, 132 are lifted out of the bearing grooves 34, 134, 234, as can be seen in particular from FIGS. 9, 12, 27 and 30. In particular, this expediently releases the displacement of the retaining clip 20, 120, 220 from the insertion position into the blocking position.

A further embodiment of the invention provides that the bearing grooves 34 are arranged behind the spreading means in a direction in which the bearing arms 22 extend. For example, this arrangement is shown in FIG. 3. A positioning groove 38 is appropriately formed between the respective bearing groove 34 and the respective spreading means 36. In an advantageous manner, the detent 32 of the clamp cage 12 is arranged in the position groove 38 in the rest state of the bearing arms 22 and in the blocking position of the retaining clip 20 in such a way that, in particular, the expanding means 36 is supported in a force-locking manner on an outer circumference of the mating connector 2, in particular of the plug shank 14. This preferred arrangement of the detent 32 in the positioning groove 38 and of the expanding means 36 in a supporting function on the outer circumference of the plug shank 14 is shown particularly advantageously in FIG. 15. Of particular advantage, this design, especially the expanding means 36 supported in a force-fit manner on the outer circumference, generates a resistance to a displacement of the retaining clip 20 from the blocking position into the insertion position.

In particular, the bearing arms 22, as shown by way of example in FIGS. 3, 6, 9, 12 and 15, each have at least one expansion slope 40a, 40b rising towards the free end of the bearing arms 22. In each case, an expansion slope 40a conveniently opens above the bearing groove 34 and the bearing groove 34 preferably directly adjoins the expansion slope 40a.

Alternatively or additionally, an expansion slope 40b opens above the positioning groove 38. According to an equally preferred variant, the positioning groove 38 directly adjoins the expansion slope 40b. The expansion slopes 40b in the immediate vicinity of the positioning grooves 38 are also shown in FIGS. 3, 6, 9, 12 and 15.

An alternative embodiment provides that the bearing grooves 134, 234 are arranged in front of the expanding means 136, 234 in a direction of extension of the bearing arms 122, 222. In particular, this embodiment is shown in FIGS. 21, 24, 27, 30, 33 and 36. Expediently, the detent means 132 of the clamp cage 112, 212 is arranged in the bearing groove 134, 234 in the rest state of the bearing arms 122, 222 and in the insertion position of the retaining clip 120, 220, as shown in FIGS. 21 and 24, such that a resistance to a displacement of the retaining clip 120, 220 from the insertion position to the blocking position is generated.

Particularly advantageously, the bearing arms 122, 222 preferably each have at least one expansion slope 140a, 140b rising towards the free end of the bearing arms 122, 222. This design is shown as an example in FIGS. 21, 24, 27, 30 and 33. In particular, in each case an expansion slope 140a opens above the bearing groove 134, 234 and the bearing groove 134, 234 directly adjoins the expansion slope 140a. In addition or alternatively, an expansion slope 140b is formed on each of the expanding means 136, 236, whereby, in particular in the rest state of the bearing arms 122, 222 and the blocking position of the retaining clip 120, 220, shown in FIG. 33, the expanding means 136, 236 can be supported in a force-locking manner on an outer circumference of the mating connector 2. Advantageously, this creates a resistance to a displacement of the retaining clip 120, 220 from the blocking position into the insertion position. In particular, the clamp cage 212 shown in FIG. 36 and the retaining clip 220 shown in FIG. 35 can be designed in accordance with this embodiment.

Figure 27:
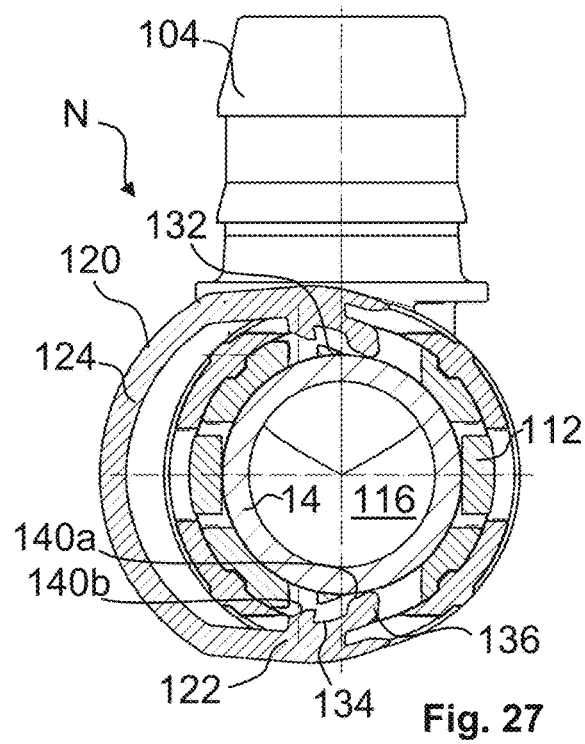
FIG. 27a is a sectional view along the parting line N-M as shown in FIG. 25.
Figure 28:
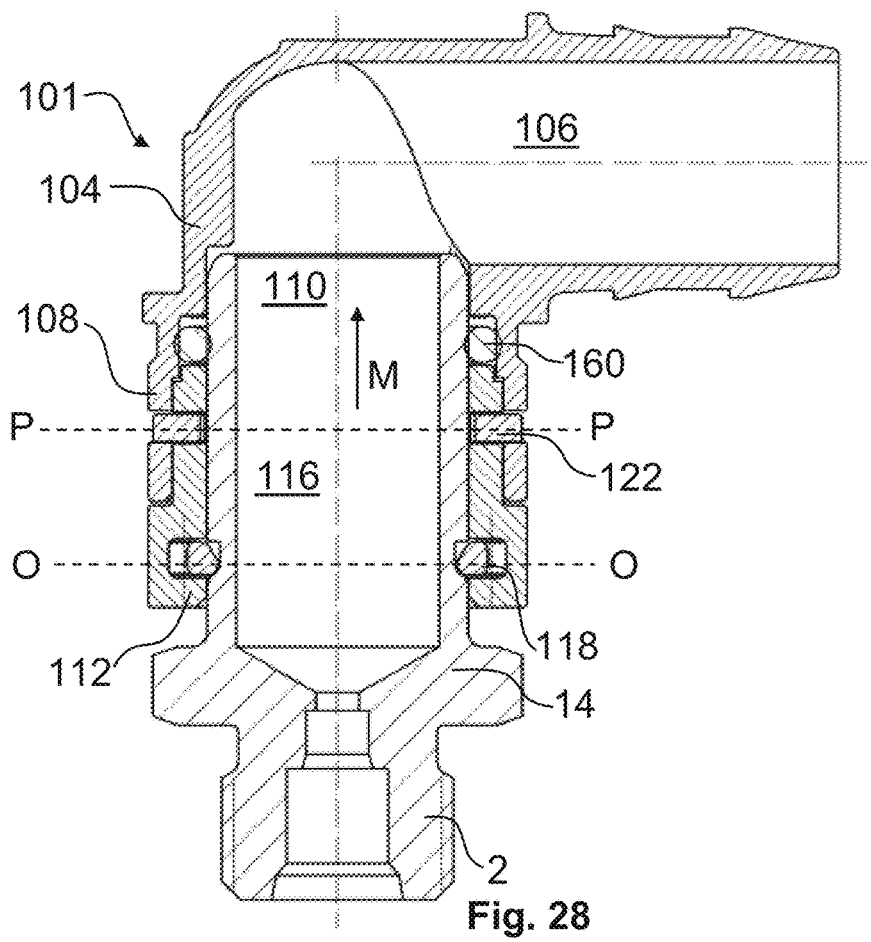
FIG. 28a is a sectional view along a mounting direction of a connector according to the invention with a fully inserted mating connector in a fourth mounted state with the retaining clip in insertion position.
Figure 30:
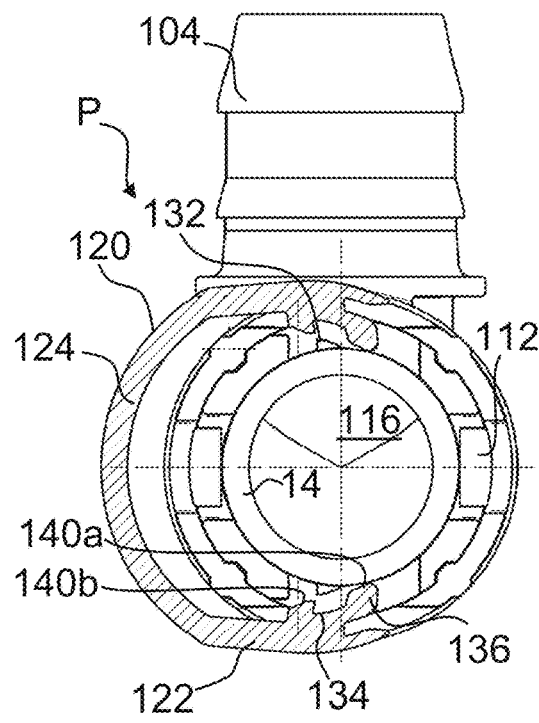
FIG. 30a is a sectional view along the parting line P-P as shown in FIG. 28.
Figure 31:
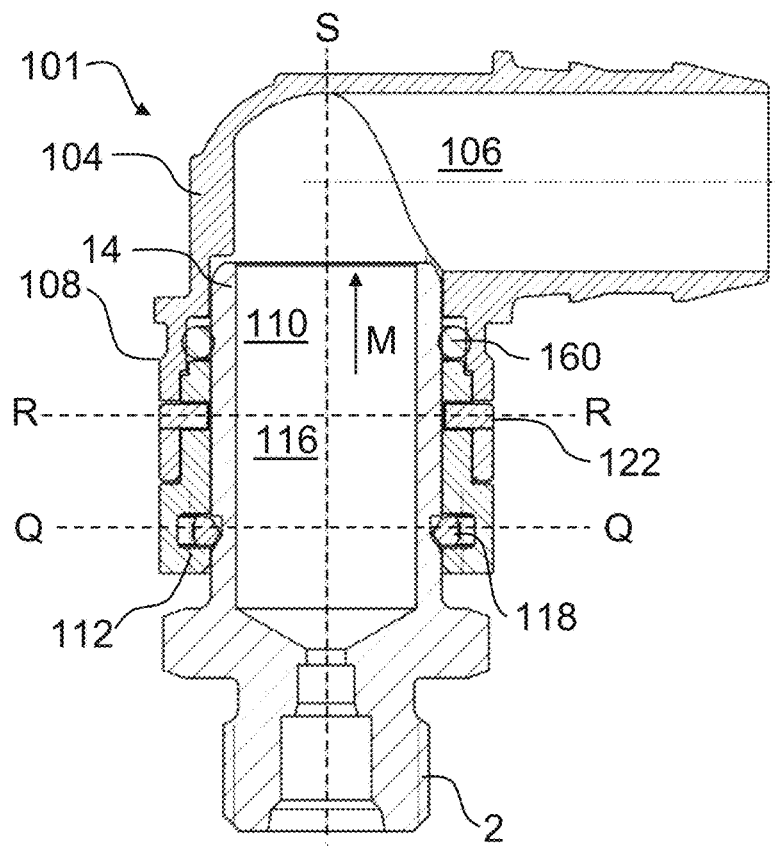
FIG. 31a is a sectional view along a mounting direction of a connector according to the invention with a fully inserted mating connector in a fifth mounted state with the retaining clip in the blocking position.

Expediently, the bearing arms 122, 222 are designed such that the expanding means 136, 236 of the bearing arms 122, 222, as shown by way of example in FIGS. 21, 24, 27, 30 and 33, are arranged behind a center axis of the through opening 116, 216, at least in the insertion position of the retaining clip 120, 220, in each case pointing towards the free ends of the bearing arms 122, 222. In particular, when, as shown in FIGS. 27, 30 and 33, the mating connector 2 is inserted into the through opening 116, 216, the expanding means 136, 236 are supported on the plug shank 14 of the mating connector 2 such that the plug shank 14 is engaged behind by the bearing arms 122, 222. Due to the restoring force resulting from the radial elastic deformation, the expanding means 136, 236 press on the plug shank 14 and generate a displacement force which urges the connecting section 124, 224 of the retaining clip 120, 220 in the direction of the center axis. In particular, the resulting displacement force has the effect that the retaining clip 120, 220 is automatically transferred from the insertion position to the blocking position as soon as the plug shank 14 is completely arranged in the through opening 116, 216 and the retaining arms 118, 218 project into the latching groove of the mating connector 2 in the rest state. In particular, the clamp cage 212 shown in FIG. 36 and the retaining clip 220 shown in FIG. 35 can be designed in accordance with this embodiment.

Furthermore, it is advantageous for assembly and operational safety if the retaining arms 18, 118, 218 each have a retaining groove 42, 142, 242 which is open radially outwards. The retaining groove 42, 142, 242 is preferably designed to correspond to a blocking means 44, 144, 244 of the clamp cage 12, 112, 212 in such a way that in the tension state of the retaining arms 18, 118, 218 and in the insertion position of the retaining clip 20, 120, 220, the blocking means 44, 144, 244 is arranged in the retaining groove 42, 142, 242. The retaining groove 42, 142 and the blocking means 44, 144 are shown in different positions relative to one another in FIGS. 5, 8, 11, 14, 20, 23, 26, 29 and 32, with FIGS. 5, 8, 23 and 26 in particular illustrating how the blocking means 44, 144 is arranged in the retaining groove 42, 142 and in particular fulfills a blocking function against displacement of the retaining clip 20, 120 from the insertion position into the blocking position. In this respect, when the retaining arms 18, 118, 218 are in the tension state and the retaining clip 20, 120, 220 is in the insertion position, the blocking means 44, 144, 244 is suitably arranged in the retaining groove 42, 142, 242 in such a way that a displacement of the retaining clip 20, 120, 220 from the insertion position into the blocking position is blocked.

In an optional variant of the invention, it is intended that a first groove wall of the retaining groove 42, 142, 242 is formed pointing from a bearing element 46, 146, 246 projecting radially outwards from the retaining arm 18, 118, 118 towards the free end of the retaining arm 18, 118, 228. This variant is advantageously shown in FIGS. 3, 5, 8, 11, 14, 18, 20, 23, 26, 29, 32 and 36.

In particular, in the rest state of the retaining arm 18, 118, 218 and the blocking position of the retaining clip 20, 120, 220, as shown in FIGS. 14 and 32, the bearing element 46, 146, 246 lies against the blocking means 44, 144, 244, pointing radially outwards with respect to the through opening 16, 116, 216, in such a way that radial elongation of the retaining arms 18, 118, 218 and transfer of the retaining arms 18, 118, 218 from the rest state to the tension state is blocked in an expedient manner.

FIGS. 3, 5, 8, 11, 14, 18, 20, 23, 26, 29, 32 and 36 also show a further development of the bearing element 46, 146, 246, according to which the bearing element 46, 146, 246 is designed as a ramp element. The ramp element has a sloping surface 48, 148, 248 rising towards the free end of the respective retaining arm 18, 118, 218, which has advantages in terms of manufacturing technology.

A particular combination of features is shown in FIGS. 5, 8, 11, 14, 20, 23, 26, 29, 32 and 35 and provides that the reinforcing struts 28, 128, 228 serve as blocking means 44, 144, 244. In particular, this embodiment synergistically improves the assembly and operational safety and increases the rigidity of the clamp cage 12, 112, 212, which also contributes to (leakage) safety. In the aforementioned advantageous manner, the reinforcing struts 28, 128, 228 designed as blocking means 44, 144, 244 are arranged in the retaining grooves 42, 142, 242 in the rest state of the retaining arms 18, 118, 215 and in the insertion position of the retaining clip 20, 120, 220.

A further special design is shown in FIGS. 3, 6, 9, 12 and 15. Here, the retaining clip 20 has at least one, in particular two, support arms 50. The illustrated embodiments each have two support arms 50. The support arm or arms 50 are preferably arranged between the bearing arms 22 and are designed in particular to extend parallel to the bearing arms 22 to form a support head 52. It has been found to be advantageous that, according to an adapted embodiment, in the blocking position of the retaining clip 20, the respective support head 52 is arranged in a respective correspondingly designed head receptacle 54 in the outer circumference of the clamp cage 12. FIG. 15 shows particularly advantageously how, in the blocking position of the retaining clip 20, the two support arms 50 are supported by their support heads 52 in correspondingly formed head receptacles 54. In a preferred development, the connector 101, 202 corresponding to the variant shown in FIGS. 16 to 40 can also have the features of this embodiment.

The retaining clip 20 advantageously has at least one guide pin 56 as an alternative or in addition to one of the aforementioned embodiments. The guide pin 56 is particularly advantageously shown in FIGS. 3, 5, 8, 11 and 12. As shown, the guide pin 56 is preferably arranged between the retaining arms 18 and is advantageously designed to extend parallel to the retaining arms 18 to a support end. It has been shown to be advantageous for assembly safety that, in the blocking position of the retaining clip 20, the guide pin 56 rests with its support end against an outer circumference of the clamp cage 12. This design can also be combined with the connector 101, 201 according to the embodiment shown in FIGS. 16 to 40.

According to a further development of the invention, which is shown in particular in FIG. 14, the clamp cage 12 has a guide channel 58 formed to correspond to the guide pin 56. The guide pin 56 preferably engages in the guide channel 58 radially to the through opening 16 at least in the blocking position of the retaining clip 20. This embodiment can also be combined with the connector 101, 202, corresponding to the embodiment shown in FIGS. 16 to 40.

Conveniently, the guide channel 58 extends through two bearing bases 59. In particular, the bearing bases 59 are shown in FIG. 2. The bearing bases 59 are preferably designed in such a way that, in the state of the clamp cage 12 mounted in the receptacle channel 10, the bearing bases 59 ensure an advantageous distance between the collar of the clamp cage 12 and the end of the base element 4 pointing towards the mounting direction M. Likewise, this embodiment can be combined with the connector 101, 202, corresponding to the embodiment shown in FIGS. 16 to 40.

Particularly advantageously, as shown in FIGS. 4, 7, 10, 13, 19, 22, 25, 28, 31 and 34, at least one sealing element 60, 160, in particular an O-ring, is arranged in the receptacle channel 10, 110. Preferably, according to an embodiment not shown, two sealing elements 60, 160 are arranged in the receptacle channel 10, 110. In particular, the connector 201 shown in FIGS. 37 and 39 can be designed according to this embodiment.

The sealing element 60, 160 is expediently positioned between a side wall of the clamp cage 12, 112 pointing in mounting direction M and a step area pointing against the mounting direction M and extending perpendicularly from an inner wall of the receptacle channel 10, 110.

The sealing element 60, 160 is particularly advantageous for a peripheral sealing of the plug shank 14 against the sleeve section 8, 108 respectively the inner wall of the receptacle channel 10, 110.

A three-part seal, not shown, has proven to be particularly advantageous. The seal therefore advantageously has two sealing elements 60, 160, in particular O-rings, which are separated from each other by a spacer ring. This three-part composite is conveniently mounted in the receptacle channel 10, 110 according to the previously mentioned method.

According to a preferred embodiment of the invention, which is shown in particular in FIGS. 18, 20, 23, 26, 29, 32 and 36, the retaining clip 120, 220 has at least one, in particular two, radially elastic gripping arms 166, 266 opposite one another. The gripping arms 166, 266 extend from a section formed on the connecting section 124, 224 and/or the retaining arms 118, 218 in a direction towards the free ends of the retaining arms 118, 218. Conveniently, the gripping arms 166, 266 each have an end section radially spaced from the retaining arms 118, 218, in particular such that the gripping arms 166, 266 can be elastically deformed towards the retaining arms 118, 218 by a force acting radially on the end section. The gripping arms 166, 266 thereby improve a grip of the retaining clip 120, 220, which is particularly advantageous for transferring the retaining clip 120, 220 from the blocking position to the insertion position. The embodiment of the invention with the gripping arms 166, 266 can also be expediently combined with the embodiment example of the connector 1 shown in FIGS. 1 to 15.

In particular, the clamp cage 112, 212 is positively-locking held by means of at least one radially elastic latching arm 168, 268 with a radially outwardly projecting latching extension 170, 270, which in the inserted state positively-locking engages in a recess 172 in a circumferential wall of the sleeve section 108, 208. This embodiment of the clamp cage 112, 212 is shown in particular in FIGS. 17 and 35. Conveniently, the latching arm 168, 268 is formed on the outer circumference of the clamp cage 112, 212.

In particular, in a preferred variant of the invention, the clamp cage 112 is positively-locking held by means of at least two radially elastic latching arms 168 with radially outwardly projecting latching projections 170, which in the inserted state positively-locking engage in recesses 172 in a circumferential wall of the sleeve section 108. This embodiment corresponds to the embodiment variant of the clamp cage 112 shown in FIG. 17. A connector 101 adapted for this purpose is shown as an example in FIG. 1, whereby this embodiment of the invention can also be expediently combined with the embodiment example of the connector 1 shown in FIGS. 1 to 15. In particular, the latching arms 168 are formed on the outer circumference of the clamp cage 112.

A further advantageous embodiment for arranging the clamp cage 212 in the sleeve section 208 provides that the retaining clip 220 has between the bearing arms 222 at least one pin 276 projecting radially towards the through opening 216, wherein the sleeve section 208 and the clamp cage 212 each have at least one through opening radial to the mounting direction M. These embodiments of the clamp cage 212 and the retaining clip 220 are shown in particular in FIGS. 35 and 36. Advantageously, a through opening of the clamp cage 212 and of the sleeve section 208 are each arranged in alignment with one another in an inserted state of the clamp cage 212 in the sleeve section 208, in particular in such a way that the retaining clip 220 can be inserted with the pin 276 radially to the mounting direction M through the through opening of the clamp cage 212 and of the sleeve section 208. A particular embodiment of the pin 276 is shown in FIG. 36. This embodiment provides that the locking pin 280 is arranged axially offset with respect to the mounting direction relative to the pin 276.

An expedient variant provides that radially opposite the through opening 216, the clamp cage 212, as shown in FIG. 35, has the radially elastic latching arm 268 with the radially outwardly projecting latching projection 270 formed on the outer circumference, which in the inserted state engages in a positive-locking manner in the recess in the circumferential wall of the sleeve section 208.

In the following, the advantageous embodiments shown in FIGS. 4 to 15 and 19 to 34 are used to illustrate the insertion and assembly of a mating connector 2. Since the insertion and assembly process of the variants of the clamp cage 212 and the retaining clip 220 of the connector 201 shown in FIGS. 35 to 40 does not differ from the insertion and assembly process shown in FIGS. 19 to 34, a separate illustration is not provided.

Figure 19:
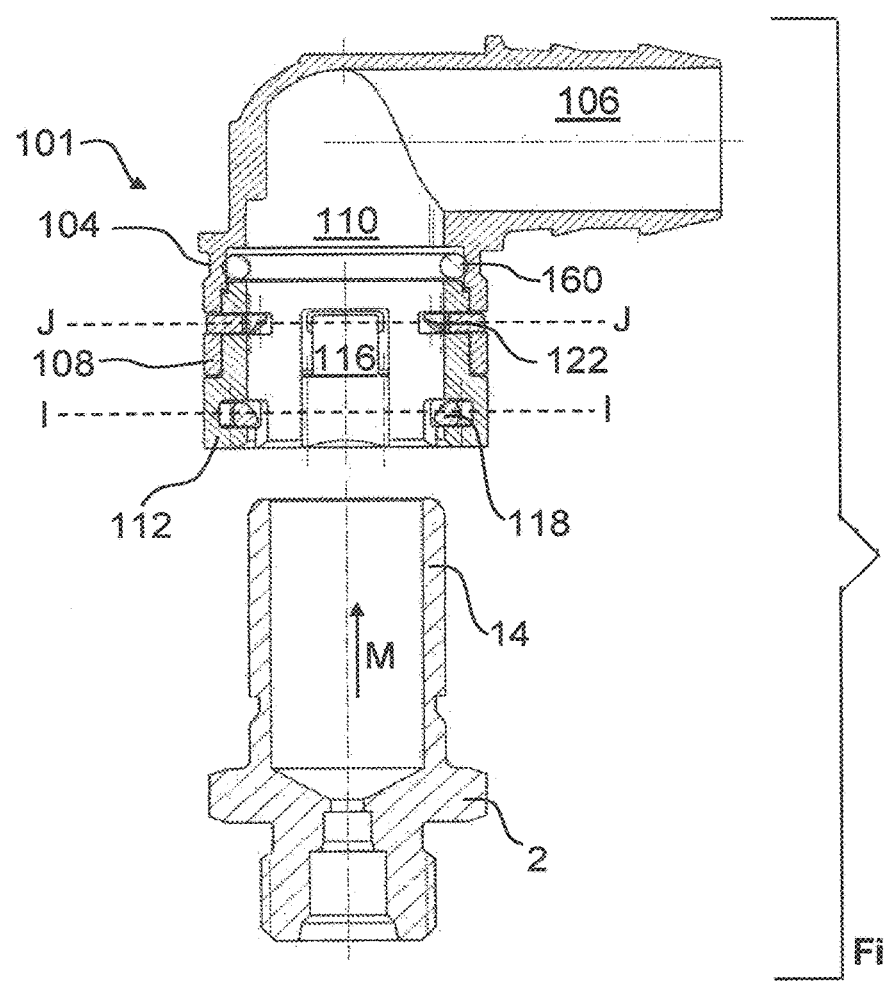
FIG. 19a is a sectional view along a mounting direction of the mating connector of the invention from FIG. 1 with a non-inserted mating connector in a first mounted state with the retaining clip in the insertion position.
Figure 20:
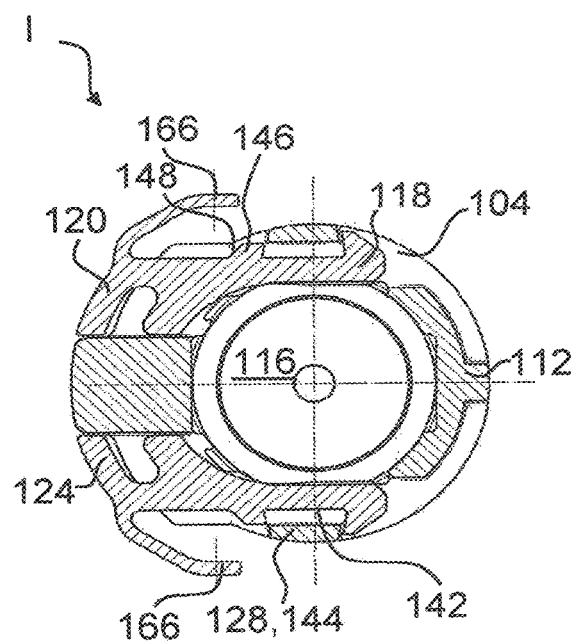
FIG. 20a is a sectional view along parting line I-I as shown in FIG. 19.

FIGS. 19 to 21 show the connector 101 with an unmounted mating connector 2 and the retaining clip 20 in the insertion position. Both the retaining arms 118 and the bearing arms 122 are each in their rest state. In particular, the bearing arms 122, in cooperation with the latching means 132 of the clamp cage 112, block a displacement of the retaining clip 120 from the insertion position to the blocking position. Simultaneously, the retaining clip 120 is secured against falling out of the base element 104 and/or the clamp cage 112. Likewise, the states are also present in the case of a connector 1, corresponding to the embodiment shown in FIGS. 16 to 34, with an unmounted mating connector 2.

FIGS. 4 to 6 and 22 to 24 show the mating connector 1, 101 with a mating connector 2 partially inserted in the mounting direction M and the retaining clip 20, 120 in the insertion position. During an insertion process, the mating connector 2 is inserted with its plug shank 14 in the mounting direction M into the through opening 16, 116. In doing so, the plug shank 14 passes a section in the through opening 16, 116 in which the retaining arms 18, 118 project into the through opening 16, 116, as illustrated in FIGS. 4 to 6 and 22 to 24. Conveniently, the plug shank 14 and the retaining arms 18, 118 are designed to correspond to one another in such a way that the plug shank 14 exerts a force acting radially outwards with respect to the mounting direction M on the retaining arms 18, 118. Alternatively, a side pointing towards the mounting direction M can have an insertion slope that rises in the insertion direction for better insertion of the plug shank 14. As a result of the outwardly acting force, the retaining arms 18, 118 and the bearing arms 22, 122 are each elastically deformed radially outwards from the rest state into the tension state.

Figure 5:
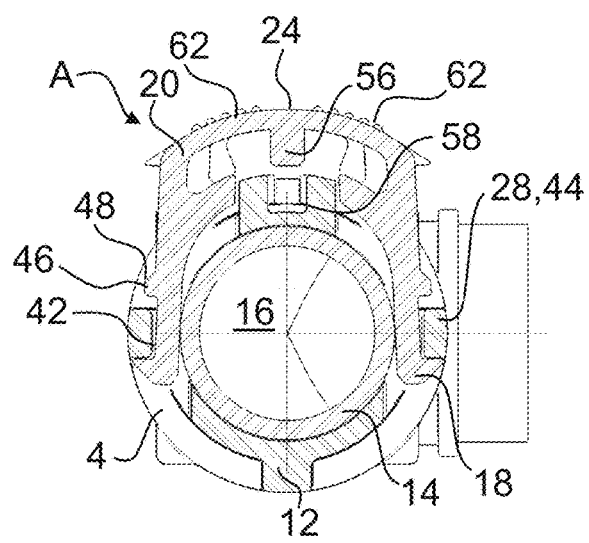
FIG. 5 is a sectional view along parting line A-A as shown in FIG. 4.

FIGS. 5 and 23 show that in this state the retaining arms 18, 118 are in the tension state. In this case, appropriate blocking means 44, 144 are arranged in retaining grooves 42, 142 of the retaining arms 18, 118 and prevent the retaining clip 20, 120 from being transferred from the insertion position to the blocking position. FIGS. 6 and 24 show that in this state the bearing arms 22, 122 are in the rest state. Furthermore, advantageous detents 32, 132 of the clamp cage 12, 112 are arranged in bearing grooves 34, 134 of the bearing arms 22, 122 and also prevent the retaining clip 20, 120 from being transferred from the insertion position to the blocking position, and simultaneously ensure that the retaining clip does not fall out of the base element 4, 104 and/or the clamp cage 12, 112.

Figure 9:
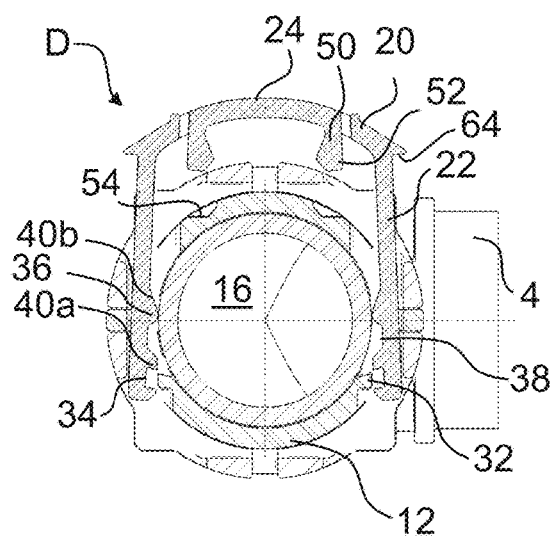
FIG. 9 is a sectional view along the parting line D-D as shown in FIG. 7.
Figure 10:
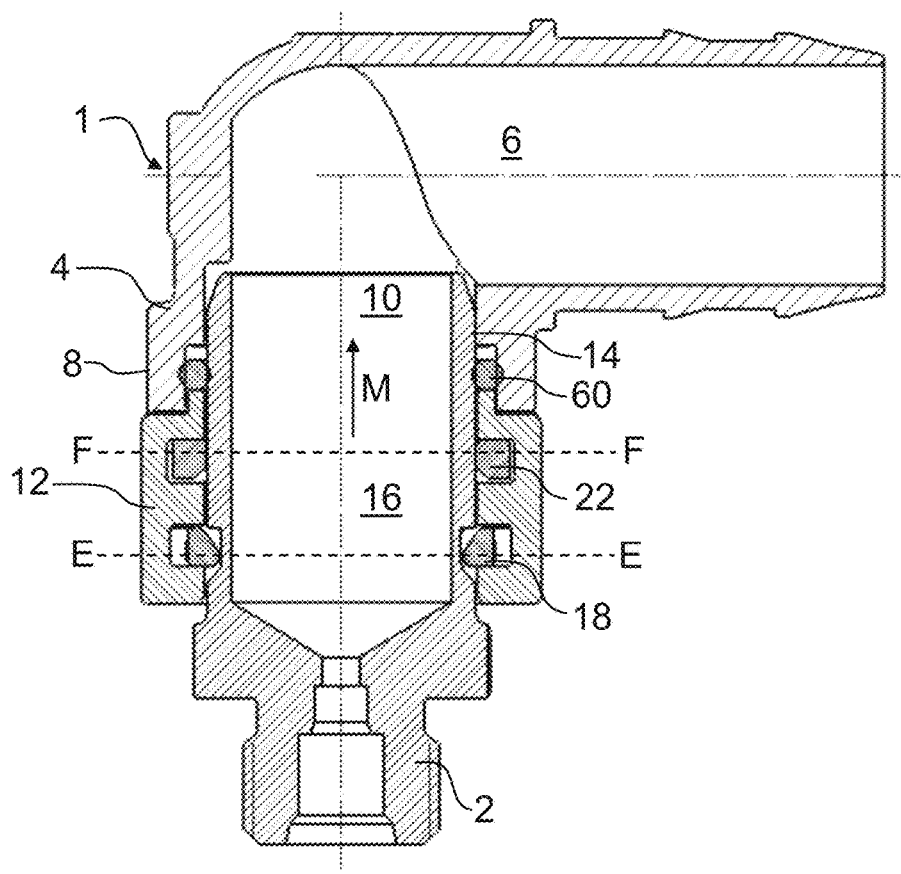
FIG. 10a is a sectional view along a mounting direction of a connector according to the invention with a fully inserted mating connector in a third mounted state with the retaining clip in the insertion position.

In FIGS. 7 to 9 and 25 to 27, the mating connector 2 is displaced further in the mounting direction M into the through opening 16, 116 of the clamp cage 12, 112 and has passed a section in which the bearing arms 22, 122 project into the through opening 16, 116. The retaining clip 20, 120 is still in the insertion position. FIGS. 8 and 26 show that the retaining arms 18, 118 remain unchanged in the tension state. FIGS. 9 and 27 show that at this time of mounting, the plug shank 14 exerts a force acting radially outwards with respect to the mounting direction M on the bearing arms 22, 122. As a result of the outwardly acting force, the bearing arms 22, 122 are elastically deformed radially outwards from the rest state into the tension state. In particular, the elastic deformation is favored by the expanding means 36, 136 projecting into the through channel 6, 106. Due to the elastic deformation, the detent means 32, 32 on the clamp cage 12, 112 are lifted out of the bearing grooves 34, 134, so that on the part of the bearing arms 22, 122 the radial blocking of the retaining clip 20, 120 is removed.

Figure 11:
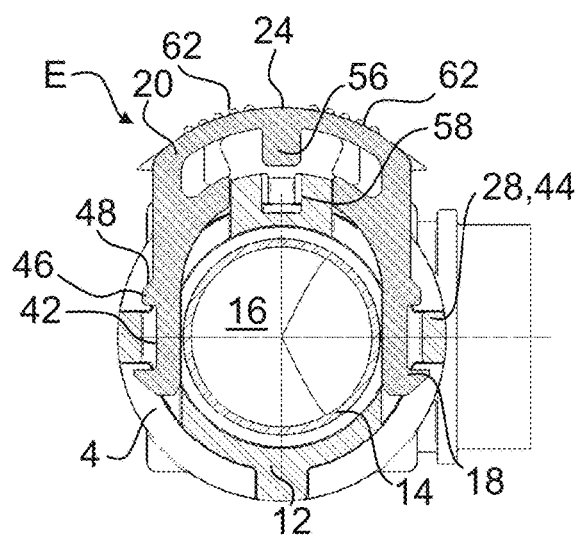
FIG. 11a is a sectional view along the parting line E-E as shown in FIG. 10.
Figure 12:
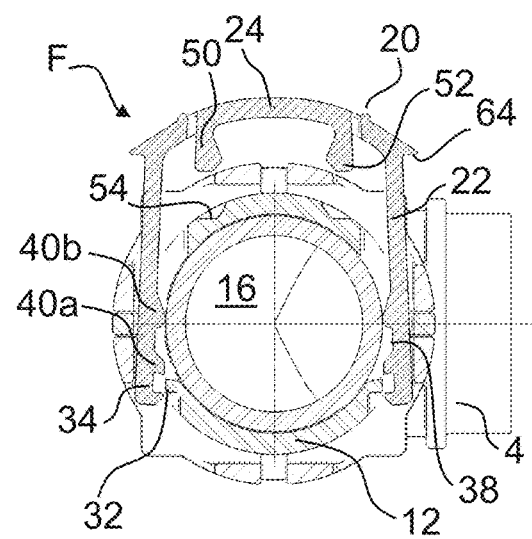
FIG. 12a is a sectional view along the parting line F-F as shown in FIG. 10.
Figure 13:
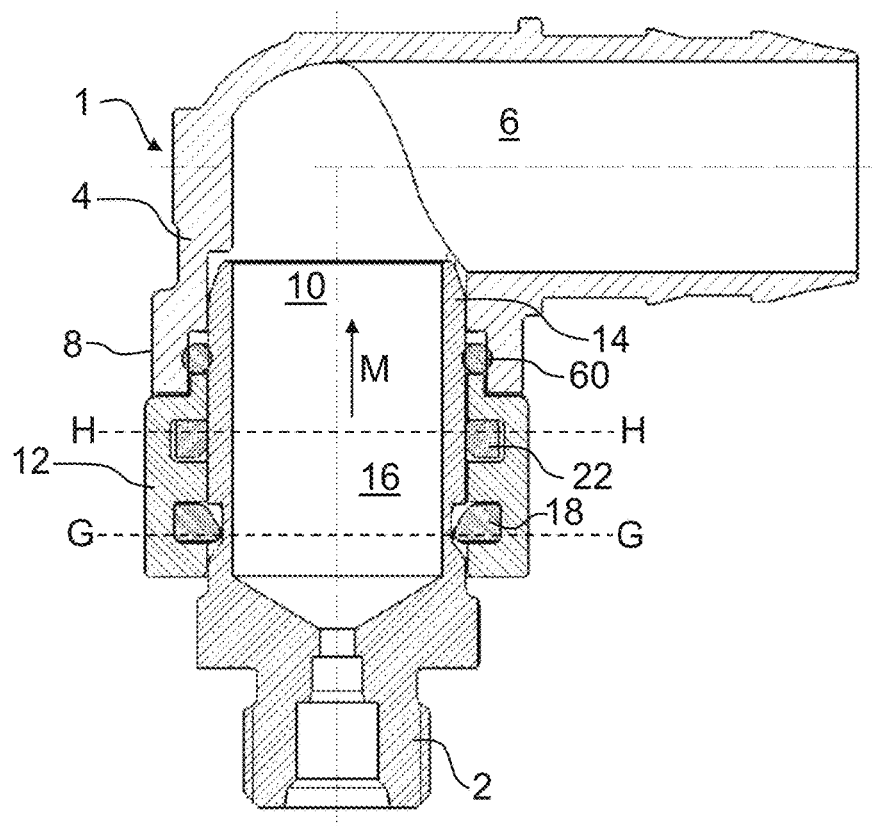
FIG. 13a is a sectional view along a mounting direction of a connector according to the invention with a fully inserted mating connector in a fourth mounted state with the retaining clip in the blocking position.
Figure 29:
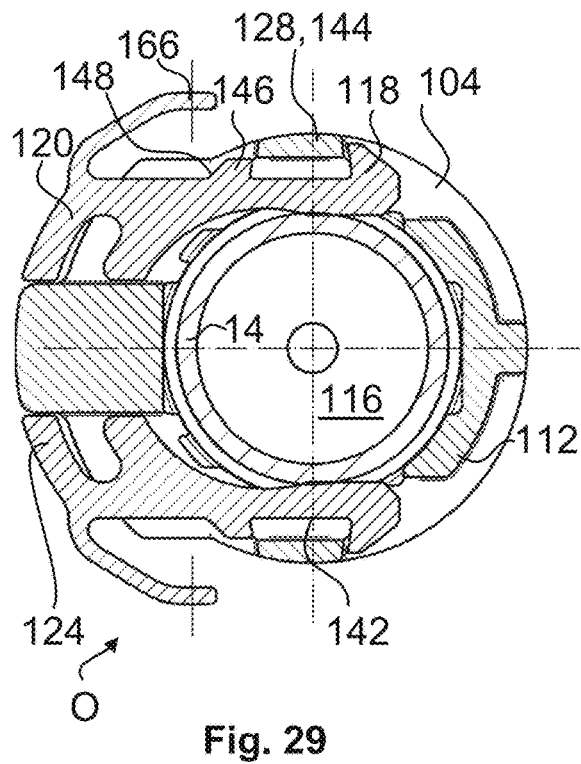
FIG. 29a is a sectional view along the parting line O-O as shown in FIG. 28.

In FIGS. 10 to 12 and 28 to 30, the mating connector 2 has been moved even further in the mounting direction M into the through opening 16, 116 of the clamp cage 12, 112 and has reached its end position. The retaining clip 20, 120 is still shown in the insertion position. In the end position of the mating connector 2, the latching groove arranged behind the plug shank 14 is arranged adjacent to the retaining arms 18, 118 of the retaining clip 20, 120. As shown in FIGS. 11 and 29, the retaining arms 18, 118 relax into the locking groove in such a way that the mating connector 2 is positively locked axially to the mounting direction M by means of the retaining arms 18, 118 and the blocking between the blocking means 44, 144 and the retaining groove 42, 142 is released. As shown in FIGS. 12 and 30, the bearing arms 22, 122 are still in the tension state with the blocking between detents 32, 132 and bearing groove 34, 134 also removed. In particular, in this mounted state the retaining clip 20, 120 can be transferred from the insertion position to the blocking position.

In FIGS. 13 to 15 and 31 to 34, the mating connector 2 is inserted completely in the mounting direction M into the through opening 16, 116 of the clamp cage 12, 112, unchanged from the mounted state shown in FIGS. 10 to 12 and 28 to 30. As FIGS. 14, 15, 32 and 33 show, the retaining clip 20, 120 is advantageously in the blocking position. FIGS. 14 and 29 show that the retaining arms 18, 118 are still in the rest state, however, due to the displacement of the retaining clip 20, 120 into the blocking position, the retaining arms 18, 118 bear with bearing elements 46, 146 against the blocking means 44, 144 in such a way that a radial deformation of the retaining arms 18, 118 is blocked. According to FIGS. 15 and 33, the bearing arms 22, 122 are also in the rest state, wherein, in particular in the advantageous embodiment shown in FIG. 15, the detents 32 of the clamp cage 12 are arranged in the positioning grooves 38 of the bearing arms 22.

Furthermore, as shown in FIGS. 15 and 33, the bearing arms 22, 122 lie with their expanding means 36, 136 against the outer circumference of the plug shank 14, which creates additional positional security. Furthermore, a preferred expansion slope 40a, 40b acts on the detent means 32, 132 or the outer circumference of the plug shank 14 in such a way that a resistance is generated which acts against the transfer of the retaining clip 20, 120 from the blocking position to the insertion position.

Expediently, in a preferred embodiment, the retaining clip 20, as shown in FIG. 3, has a surface structure 62 on the connecting section 24. This surface structure 62 is particularly advantageous for manually applying a compressive force to the retaining clip 20 for transferring the retaining clip 20 into the assembly position. This embodiment can also be combined with the connector 101 according to the embodiment shown in FIGS. 16 to 34.

In order to be able to remove the mating connector 2 from the through opening 16, 116 against the mounting direction M, the retaining clip 20, 120 must be displaced in the direction of the insertion position against the resistance generated by the expansion slopes 40a, 40b, 140a, 140b. The bearing arms 22, 122 are elastically expanded by the interaction of detents 32, 132 and expansion slopes 40a, 140a or the interaction of the expansion slopes 40b, 140b with the outer circumference of the plug shank 14.

In order to displace the retaining clip 20, 120 into the insertion position, it has proven to be advantageous if a tensile force acting radially outwards is applied to the connecting section 24, 124 of the retaining clip 20, 120. According to FIG. 3, the retaining clip 20 can have an engagement contour 64 on the connecting section 24 for this purpose, by means of which the retaining clip 20 can be levered radially outwards in a particularly advantageous manner. In addition or alternatively, the retaining clip 20, 120 can have at least one gripping arm 166, shown as an example in FIG. 18.

As soon as the retaining clip 20, 120 is arranged in the insertion position again, the plug shank 14 can be pulled out of the through opening 16, 116 in the opposite direction to the mounting direction M, whereby the retaining arms 18, 118 and the plug shank 14 of the mating connector 2 are expanded back into the tension state due to the synergetic interaction of the retaining arms 18, 118.

The invention is not limited to the illustrated and described embodiments, but also includes all embodiments having the same effect in the sense of the invention. It is expressly emphasized that the embodiments are not limited to all features in combination; rather, each individual subfeature can also have an inventive significance in its own right independently of all other subfeatures. Furthermore, the invention is not yet limited to the combination of features defined in claim 1, but can also be defined by any other combination of certain features of all the individual features disclosed. This means that, in principle, practically any individual feature of claim 1 can be omitted or replaced by at least one individual feature disclosed elsewhere in the application.

The invention claimed is:

1. A connector for connecting a first fluid line to a mating connector, comprising a base element with a through channel, wherein the through channel is fluidically connected to an end of the base element designed as a sleeve section, wherein a clamp cage is arranged in a receptacle channel of the sleeve section, wherein the clamp cage can be inserted into the receptacle channel of the sleeve section in a mounting direction and is held axially to the mounting direction in a positive-locking manner, wherein two retaining arms extending parallel to one another of a retaining clip which can be inserted into the clamp cage perpendicular to the mounting direction project into a through opening of the clamp cage when the retaining arms are in a rest state and are designed to be elastically expandable radially to the through opening into a tension state, wherein the retaining clip can be moved radially to the through opening from an insertion position into a blocking position and from the blocking position into the insertion position, wherein the retaining arms are expandable into the tension state in the insertion position of the retaining clip and the retaining arms are blocked against expansion into the tension state in the blocking position of the retaining clip, wherein the retaining clip has two bearing arms which are elastic radially to the through opening, and the bearing arms fix the clamp cage in the receptacle channel axially to the mounting direction in a positive-locking manner and in a rest state of the bearing arms project into the through opening and are designed to be elastically expandable radially to the through opening into a tension state.

2. The connector according to claim 1,
wherein while the bearing arms are in the rest state and the retaining clip is in the insertion position, the retaining clip is blocked against displacement from the insertion position to the blocking position.

3. The connector according to claim 1,
wherein while the retaining arms are in the tension state and the retaining clip is in the insertion position, the retaining clip is blocked against displacement from the insertion position to the blocking position.

4. The connector according to claim 1,
wherein while the bearing arms are in the rest state and the retaining clip is in the blocking position, the retaining clip is positively locked against displacement from the blocking position to the insertion position.

5. The connector according to claim 1,
wherein the retaining clip is U-shaped and the bearing arms and the retaining arms are connected via a connecting section and extend in the same direction from the connecting section to a free end in each case and the bearing arms and the retaining arms are arranged axially spaced apart from one another.

6. The connector according to claim 5,
wherein the retaining clip has at least one radially elastic gripping arms which lie opposite one another and which extend from a section formed on the connecting section and/or the retaining arms in the direction of the free ends of the retaining arms, the gripping arms each having an end section radially spaced from the retaining arms, so that the gripping arms can be elastically deformed towards the retaining arms by a force acting radially on the end section.

7. The connector according to claim 1,
wherein the retaining clip has at least two pressure locking humps formed on the retaining arms and/or on the connecting section on a side pointing against the mounting direction, which are formed projecting against the mounting direction in such a way that, in the blocking position of the retaining clip, the pressure locking humps can be supported radially to the through opening on an inner circumferential wall of the through opening.

8. The connector according to claim 7,
wherein two pressure-locking humps on the retaining arms are formed and arranged opposite each other in such a way that the pressure-locking humps in the blocking position of the retaining clip and the rest state of the retaining arms are arranged on an axis of symmetry of the through opening within the through opening.

9. The connector according to claim 1,
wherein the clamp cage has two windows open radially to the through opening and a reinforcing strut extending axially to the through opening is arranged in each of the windows, wherein the retaining arms extend through the windows in such a way that the retaining arms are arranged radially between the through opening and the reinforcing struts and, in the rest state, project into the through opening of the clamp cage.

10. The connector according to claim 1,
wherein the sleeve section and the clamp cage each have at least two breakthroughs radial to the mounting direction, each breakthrough of the clamp cage and the sleeve section being arranged in the sleeve section are arranged in alignment with one another, so that the retaining clip can be inserted with the bearing arms radially to the mounting direction through the breakthroughs of the clamp cage and the sleeve section into the through opening of the clamp cage.

11. The connector according to claim 10,
wherein the windows open radially for arranging and passing through of the retaining arms are arranged axially to the mounting direction at a distance from the breakthroughs for arranging and passing through the bearing arms.

12. The connector according to claim 1,
wherein the clamp cage has radially outwardly pointing detents, and the bearing arms have bearing grooves corresponding thereto, and the detents engage in the bearing grooves in the rest state of the bearing arms and the insertion position of the retaining clip, and in the rest state of the bearing arms block a displacement of the retaining clip from the insertion position into the blocking position in a positive-locking manner.

13. The connector according to claim 1,
wherein the bearing arms have radially inwardly pointing expanding means, and the expanding means project into the through opening in the insertion position of the retaining clip and the rest state of the bearing arms in such a way that the bearing arms can be expanded via the expanding means from the rest state into the tension state when the mating connector is inserted in the mounting direction, so that a displacement of the retaining clip from the insertion position into the blocking position is enabled.

14. The connector according to claim 13,
wherein bearing grooves corresponding to the bearing arms are arranged behind the expanding means in a direction of extension of the bearing arms, and a position groove is formed between the respective bearing groove and the respective expanding means, and the detent of the clamp cage is arranged in the position groove in the rest state of the bearing arms and in the blocking position of the retaining clip in such a way that the expanding means is supported in a force-locking manner on an outer circumference of the mating connector and generates a resistance to a displacement of the retaining clip from the blocking position into the insertion position.

15. The connector according to claim 14,
wherein the bearing arms each have at least one expansion slope rising towards a free end of each of the bearing arms, wherein in each case one expansion slope opens above the bearing groove and the bearing groove directly adjoins the expansion slope and/or in each case one expansion slope opens above the positioning groove and the positioning groove directly adjoins the expansion slope.

16. The connector according to claim 13,
wherein bearing grooves corresponding to the bearing arms are arranged in front of the expanding means in a direction of extension of the bearing arms and the detent of the clamp cage is arranged in the bearing groove in the rest state of the bearing arms and in the insertion position of the retaining clip in such a way that a resistance to a displacement of the retaining clip from the insertion position into the blocking position is generated.

17. The connector according to claim 16,
wherein the bearing arms each have at least one expansion slope rising towards a free end of each of the bearing arms, wherein in each case one expansion slope opens above the bearing groove and the bearing groove directly adjoins the expansion slope and/or in each case one expansion slope is formed on the expanding means, wherein in the rest state of the bearing arms and the blocking position of the retaining clip, the expanding means can be supported in a force-locking manner on an outer circumference of the mating connector and thereby generates a resistance to a displacement of the retaining clip from the blocking position into the insertion position.

18. The connector according to claim 16,
wherein the bearing arms are designed such that the expanding means of the bearing arms are arranged behind a center axis of the through opening, at least in the insertion position of the retaining clip, in each case pointing towards a free end of the bearing arms.

19. The connector according to claim 1,
wherein the retaining arms each have formed a retaining groove which is open radially outwards and which is designed to correspond to a blocking means of the clamp cage in such a way that in the tension state of the retaining arms and in the insertion position of the retaining clip the blocking means is arranged in the retaining groove in such a way that a displacement of the retaining clip from the insertion position into the blocking position is blocked.

20. The connector according to claim 19,
wherein a first groove wall of the retaining groove is formed by a bearing element projecting radially outwards from the retaining arm and pointing towards a free end of each of the retaining arm, wherein in the rest state of the retaining arm and the blocking position of the retaining clip, the bearing element bears against the blocking means, pointing radially outwards towards the through opening, in such a way that radial expansion of the retaining arms is blocked and transfer of the retaining arms from the rest state to the tension state is blocked.

21. The connector according to claim 19,
further comprising reinforcing struts serving as blocking means, so that the reinforcing struts serving as blocking means are arranged in the retaining grooves in the rest state of the retaining arms and in the insertion position of the retaining clip.

22. The connector according to claim 1,
wherein the retaining clip has at least one support arms, which are arranged between the bearing arms and are designed to extend parallel to the bearing arms to form a support head, wherein in the blocking position of the retaining clip the support head is arranged in a correspondingly designed head receptacle in the outer circumference of the clamp cage.

23. The connector according to claim 1,
wherein the retaining clip has at least one guide pin, which is arranged between the retaining arms and is designed to extend parallel to the retaining arms to a support end, wherein in the blocking position of the retaining clip the guide pin bears with its support end against an outer circumference of the clamp cage.

24. The connector according to claim 23,
wherein the clamp cage has a guide channel which corresponds to the guide pin and in which the guide pin engages radially to the through opening in the blocking position of the retaining clip.

25. The connector according to claim 1,
wherein the clamp cage is held in a positive-locking manner by means of at least one radially elastic latching arm with a radially outwardly projecting latching extension, which in the inserted state engages in a positive-locking manner in a recess in a circumferential wall of the sleeve section, the latching arm being integrally formed on the outer circumference of the clamp cage.

26. The connector according to claim 25,
wherein the clamp cage is held in a positive-locking manner by means of at least two radially elastic latching arms with radially outwardly projecting latching projections, which in the inserted state engage in a positive-locking manner in a recess in the circumferential wall of the sleeve section, the latching arms being integrally formed on the outer circumference of the clamp cage.

27. The connector according to claim 1,
wherein the retaining clip has between the bearing arms at least one pin projecting radially towards the through opening, the sleeve section and the clamp cage each having at least one through opening radial to the mounting direction, wherein a respective through opening of the clamp cage and of the sleeve section are arranged in alignment with one another in an inserted state of the clamp cage in the sleeve section, so that the retaining clip can be inserted with the pin radially to the mounting direction through the through opening of the clamp cage and of the sleeve section.

28. The connector according to claim 27,
wherein the clamp cage has the radially elastic latching arm with the radially outwardly projecting latching extension formed on the outer circumference radially opposite the through opening of the feedthrough opening, which in the inserted state engages in a positive-locking manner in the recess in the circumferential wall of the sleeve section.

* * * * *